US009633391B2

(12) United States Patent
Klum et al.

(10) Patent No.: US 9,633,391 B2
(45) Date of Patent: Apr. 25, 2017

(54) SECURE PRE-LOADED DRIVE MANAGEMENT AT KIOSK

(75) Inventors: R. Daren Klum, Shoreview, MN (US); Matthew D. Fairchild, Rosemount, MN (US); Keith A. Pagan, Orlando, FL (US); Daniel L. Hench, Orlando, FL (US)

(73) Assignee: CRAM Worldwide, LLC, Minneapolis, MN (US)

( * ) Notice: Subject to any disclaimer, the term of this patent is extended or adjusted under 35 U.S.C. 154(b) by 880 days.

(21) Appl. No.: 13/267,488

(22) Filed: Oct. 6, 2011

(65) Prior Publication Data
US 2012/0022977 A1 Jan. 26, 2012

Related U.S. Application Data

(63) Continuation-in-part of application No. 13/075,674, filed on Mar. 30, 2011.

(51) Int. Cl.
G06F 21/00 (2013.01)
G06Q 30/06 (2012.01)
G06F 21/10 (2013.01)

(52) U.S. Cl.
CPC ......... G06Q 30/0641 (2013.01); G06F 21/10 (2013.01)

(58) Field of Classification Search
CPC .................... G06F 21/123; G06F 2211/007
USPC .......................................................... 705/55
See application file for complete search history.

(56) References Cited

U.S. PATENT DOCUMENTS

| 6,018,581 | A | 1/2000 | Shona et al. |
| 6,055,314 | A | 4/2000 | Spies et al. |
| 6,584,450 | B1 | 6/2003 | Hastings et al. |
| 6,668,326 | B1 | 12/2003 | Sella et al. |
| 6,748,539 | B1 | 6/2004 | Lotspiech |
| 6,820,148 | B1 | 11/2004 | Cedar et al. |
| 6,980,659 | B1 | 12/2005 | Elliott |
| 7,020,636 | B2 | 3/2006 | Ohmori et al. |
| 7,024,381 | B1 | 4/2006 | Hastings et al. |
| 7,080,039 | B1 | 7/2006 | Marsh |
| 7,162,645 | B2 | 1/2007 | Iguchi et al. |
| 7,247,791 | B2 | 7/2007 | Kulpa |
| 7,270,866 | B2 | 9/2007 | Noraev |
| 7,284,697 | B2 | 10/2007 | Vanzini et al. |
| 7,293,066 | B1 | 11/2007 | Day |
| 7,336,788 | B1 | 2/2008 | Hendricks |

(Continued)

OTHER PUBLICATIONS

International Searching Authority, "International Search Report ", "from Foreign Counterpart of U.S. Appl. No. 12/858,384", Oct. 22, 2010, pp. 1-15, Published in: WO.

(Continued)

Primary Examiner — James A Reagan
(74) Attorney, Agent, or Firm — Pederson IP, LLC

(57) ABSTRACT

Methods, systems, and apparatus for digital content management and distribution are provided. In an example, a method of protecting digital content at a kiosk is provided. The method includes providing a plurality of memory devices, the plurality of memory devices having pre-loaded content thereon. A selection is received from a user. A memory device is selected from the plurality of pre-loaded memory devices that matches the selection from the user. A dock to which the memory device is to be coupled is determined. The memory device is protected with a unique key corresponding to the dock.

20 Claims, 9 Drawing Sheets

(56) References Cited

U.S. PATENT DOCUMENTS

| | | |
|---|---|---|
| 7,366,302 B2 | 4/2008 | Candelore |
| 7,379,548 B2 | 5/2008 | Revital et al. |
| 7,401,727 B2 | 7/2008 | Calonje et al. |
| 7,434,065 B2 | 10/2008 | Rodgers et al. |
| 7,444,306 B2 | 10/2008 | Varble |
| 7,461,406 B2 | 12/2008 | Pelly et al. |
| 7,568,613 B1 | 8/2009 | Dillon et al. |
| 7,934,105 B1 | 4/2011 | Buckingham |
| 8,010,805 B2 | 8/2011 | Gervais et al. |
| 2001/0029583 A1 | 10/2001 | Palatov et al. |
| 2002/0106082 A1 | 8/2002 | Kori et al. |
| 2002/0146125 A1 | 10/2002 | Eskicioglu et al. |
| 2003/0059047 A1 | 3/2003 | Iwamura |
| 2004/0068655 A1 | 4/2004 | Nishimura et al. |
| 2004/0088552 A1 | 5/2004 | Candelore |
| 2004/0088558 A1 | 5/2004 | Candelore |
| 2005/0004873 A1 | 1/2005 | Pou et al. |
| 2005/0108532 A1 | 5/2005 | Bajikar |
| 2005/0120380 A1 | 6/2005 | Wolfe |
| 2005/0165806 A1 | 7/2005 | Roatis et al. |
| 2005/0175182 A1 | 8/2005 | Ueno et al. |
| 2005/0192686 A1 | 9/2005 | Hirota et al. |
| 2005/0227773 A1 | 10/2005 | Lu et al. |
| 2006/0036549 A1 | 2/2006 | Wu |
| 2006/0039559 A1 | 2/2006 | Wasilewski |
| 2006/0039560 A1 | 2/2006 | Wasilewski |
| 2006/0041905 A1 | 2/2006 | Wasilewski |
| 2006/0053079 A1 | 3/2006 | Edmonson et al. |
| 2006/0109982 A1 | 5/2006 | Puiatti et al. |
| 2006/0126846 A1 | 6/2006 | Araki et al. |
| 2006/0137015 A1 | 6/2006 | Fahrny et al. |
| 2006/0168609 A1 | 7/2006 | Chen |
| 2006/0174259 A1 | 8/2006 | Kim |
| 2006/0233368 A1 | 10/2006 | Thompson |
| 2006/0245725 A1 | 11/2006 | Lim |
| 2006/0294018 A1 | 12/2006 | Tuoriniemi |
| 2007/0083758 A1 | 4/2007 | Topham et al. |
| 2007/0083759 A1 | 4/2007 | Drew et al. |
| 2007/0124804 A1 | 5/2007 | Burnham et al. |
| 2007/0147611 A1 | 6/2007 | Stone et al. |
| 2007/0192628 A1 | 8/2007 | Stone et al. |
| 2007/0204349 A1 | 8/2007 | Sparks et al. |
| 2007/0206247 A1 | 9/2007 | Kaplan |
| 2007/0256126 A1 | 11/2007 | Erickson et al. |
| 2007/0282747 A1 | 12/2007 | Shen et al. |
| 2008/0022134 A1 | 1/2008 | Wang |
| 2008/0044019 A1 | 2/2008 | Junod |
| 2008/0137867 A1 | 6/2008 | Wasilewski |
| 2008/0170698 A1 | 7/2008 | Candelore |
| 2008/0219443 A1 | 9/2008 | Candelore |
| 2008/0235144 A1* | 9/2008 | Phillips ............... G06Q 20/327 705/67 |
| 2008/0247543 A1 | 10/2008 | Mick et al. |
| 2009/0006846 A1 | 1/2009 | Rosenblatt |
| 2009/0019501 A1 | 1/2009 | Saxena et al. |
| 2009/0053992 A1 | 2/2009 | Butler |
| 2009/0060470 A1 | 3/2009 | Kurauchi |
| 2009/0086978 A1 | 4/2009 | McAvoy et al. |
| 2009/0113116 A1 | 4/2009 | Thompson et al. |
| 2009/0125643 A1 | 5/2009 | Prevost et al. |
| 2009/0125645 A1 | 5/2009 | Prevost et al. |
| 2009/0158316 A1 | 6/2009 | Kokernak et al. |
| 2009/0168996 A1 | 7/2009 | Candelore |
| 2009/0172219 A1 | 7/2009 | Mardiks |
| 2009/0172274 A1 | 7/2009 | Nochimowski et al. |
| 2009/0172400 A1 | 7/2009 | Rave et al. |
| 2009/0177886 A1 | 7/2009 | Takano et al. |
| 2009/0187772 A1 | 7/2009 | Lange et al. |
| 2009/0190142 A1* | 7/2009 | Taylor ............... G06F 1/1632 358/1.1 |
| 2009/0240947 A1 | 9/2009 | Goyal et al. |
| 2009/0248794 A1 | 10/2009 | Helms et al. |
| 2009/0249420 A1 | 10/2009 | Kim et al. |
| 2009/0290711 A1 | 11/2009 | Bloom et al. |
| 2009/0296937 A1 | 12/2009 | Suu et al. |
| 2009/0323946 A1 | 12/2009 | Wasilewski |
| 2010/0017840 A1 | 1/2010 | Akins, III et al. |
| 2010/0020963 A1 | 1/2010 | Candelore |
| 2010/0020975 A1 | 1/2010 | Bissett |
| 2010/0023650 A1 | 1/2010 | Prevost et al. |
| 2010/0023777 A1 | 1/2010 | Prevost et al. |
| 2010/0088514 A1 | 4/2010 | Nunez et al. |
| 2010/0131968 A1 | 5/2010 | Newell et al. |
| 2010/0138857 A1 | 6/2010 | Gondkar |
| 2010/0153730 A1 | 6/2010 | Goria |
| 2010/0332723 A1* | 12/2010 | Lin ............... H04N 21/4367 711/100 |
| 2011/0015985 A1 | 1/2011 | Curtis |
| 2011/0029435 A1* | 2/2011 | Ronen ............... G06Q 10/10 705/53 |
| 2011/0150436 A1 | 6/2011 | Hesselink |

OTHER PUBLICATIONS

U.S. Patent and Trademark Office, "Office Action", "U.S. Appl. No. 13/075,674", Jul. 24, 2012, pp. 1-12.

International Searching Authority, "International Search Report", "from Foreign Counterpart of U.S. Appl. No. 13/267,488", Oct. 25, 2012, pp. 1-11, Published in: WO.

"IBM Cryptographic Products: General Information Manual", May 2002, pp. 1-46.

"Hardware-Based Security 16", Nov. 2007, pp. 1-38.

* cited by examiner

SECURE PRE-LOADED DRIVE MANAGEMENT AT KIOSK

CROSS-REFERENCE TO RELATED APPLICATIONS

This application is a continuation-in-part application of U.S. patent application Ser. No. 13/075,674, filed on Mar. 30, 2011, and titled "SECURE KIOSK BASED DIGITAL CONTENT DELIVERY", the disclosure of which is hereby incorporated herein by reference.

BACKGROUND

Entertainment content publishers generally sell content on an individual basis (e.g., one song at a time or a few movies at a time). Traditionally, this content is sold in a brick-and-mortar store, with the content on a storage medium such as a CD or DVD. Recently, however, content publishers have begun to distribute content through online sources and some publishers have even created their own content delivery systems. For example, some artists are now marketing music online and are airing television ads to publicize new album releases. These content delivery changes have been created out of a desire to control delivery and distribution of content, including preventing unauthorized copying.

OVERVIEW

The present inventors have recognized, among other things, that the days of prepackaged CD, DVD or Blue-ray disks are ending, while cloud computing, internet streaming, and on-demand content are growing rapidly. The existing cloud computing, internet streaming, and on-demand technologies, however, may not have sufficient bandwidth in the near term to satisfy growing consumer content desires. Additionally, many of these existing technologies are not secure, which results in easy unauthorized copying (e.g., ripping or burning) of the content using unsophisticated software systems. Finally, a downside to these existing technologies is their reliance on a delivery system (e.g., the internet, cable TV, or satellite systems) that may soon go up in price due to the cost of deployment.

Bandwidth

New storage technologies represent the future for delivering mass amounts of digital content. Soon the average consumer will have multiple terabytes of data in the home and many of these storage systems are connected to computers, media centers, or home theater systems. A content delivery system that can keep up with the consumer's massive appetite for large amounts of high-definition content is needed. There is, however, no conventional system that sends large catalogs of content to a customer while using a secure delivery method. Moreover, there is no conventional system that sends large catalogs of content without using the internet.

Security

Many content publishers have tried to secure content using digital rights management (DRM) systems, but there is a limit to the amount of digital rights management a customer will live with. Some companies developed their own DRM systems, but limit customers only to an ecosystem of devices and content delivery. Many customers are upset to find that if they try moving all their content to another provider the files won't play. This closed system approach to content delivery is one that will in the long run upset customers and hurt the industry. Customers want a way to choose their content, but they don't want to feel like they are locked down. It is fair to say that DRM has a place, but customers are very leery if they feel choices have been limited. With new technology for encryption being used by the CIA and military it's now possible to secure content at the hardware level using sophisticated new drive encryption technology. In addition, an effective content delivery system can mitigate a person's need for stealing content, because they can access mass amounts of content for a monthly fee, without having to purchase content. If you have access to it, you won't need to steal it.

Content publishers have moved into the area of internet distribution of content. Some publishers have even created their own content delivery systems out of a need to control the delivery and security of their content. However, the only winners are website e-tailers and not the publishers of the actual content. The e-tailers now have the control over distribution and this has put the content publishers in a difficult situation. Some companies have so much market share you either play by their rules or lose out on the market. The only way to ensure everyone wins is to create a new content delivery model, pricing structure, and new level of content security. Hence the need for a revolutionary new approach to delivering mass amounts of leased content. Content the user doesn't necessarily own but has rights to use for a set period of time.

Music Piracy

The rise of the internet has led to the growing epidemic of content theft for all forms of digital media. The hardest hit has been the music industry because ripping a CD is easy and the internet provides a good delivery method. During the 90's it was reported that more than 40% of the music listened to by consumers 15-34 years of age was ripped or stolen from the web. This staggering statistic has almost turned the entire music industry upside down and the studios have been looking for new ways to generate revenue. Some artists have recently denounced the internet, and there is a growing trend of artists going against traditional delivery models and looking for new ways to generate revenue illustrates the growing problems in the market.

Movie Piracy

At the birth of the cable TV industry, the story had a happy ending—industries collaborated to develop encryption standards and to set up a revenue-sharing model that now generates more than $40 billion in revenues yearly for the cable and satellite TV industries and has created more than $200 billion in business value for the cable companies, the content companies and the makers of TVs, satellite dishes, and switching equipment. Fast-forward 30 years and companies in three industries—the content creators, the broadband providers, and the PC makers—have found themselves at a standstill as they try to deliver digital video over broadband connections. This time, there is an added element of urgency: If they fail to act, illegal distribution will likely ramp up to meet market demand, and bootlegged movies could hurt box office and downstream revenues, much as file sharing took a bite out of CD sales. Video today stands where music did in 1998.

One might think it would be easy for the entertainment industry to come together to solve the piracy problem for movies. Unfortunately, the train has left the station and to change distribution paths by moving away from the internet or silver disk may ultimately upset the customer. It's the fear of upsetting the customers that has prevented solutions from coming to the forefront in the music industry and now the movie industry.

Movie piracy started with pirates using camcorders to copy movies shown in a theater, a process known as bootlegging. These cam recordings were put on the internet, usually after a film was released and were available for download from anyone free of charge, although some private sites charged money to access the free downloads. At one point a software program was released that allowed anyone to remove the CSS encryption on a DVD. Although its authors only intended the software be used for playback purposes, it also meant that one could decode the content perfectly for ripping; combined with the DivX Alpha codec released shortly after, the new codec increased video quality from near VHS to almost DVD quality when encoding from a DVD source. Movie pirates were the first to adopt this new technology and the mass consumer market soon followed. It seemed everyone you knew was ripping, stealing and sharing digital content. Many saw "ripping and burning" as a natural evolution of society that was combined with the rise of the internet. As the demand grew for downloadable movies and music file sharing networks emerged to provide a central place for sharing illegally ripped content. From this point on the entertainment industry was never the same again.

After widespread panic from the studios in 2000 there was a crackdown on content theft and the movie industry was able to convince internet providers that they were a big part of the problem. So together they started shutting down illegal download sites, and tracking down large "ripping" houses that were illegally distributing content online. Also, the studios developed advertising campaigns geared to make people feel bad for ripping and sharing. Even with the looming threat of legal ramifications, jail time, and fines, content theft continues to run rampant in the free world of the internet.

Game Piracy

For 2009, the most pirated PC game had a staggering 4.1 million downloads via torrents alone compared with an estimated 200,000-300,000 actual sales via retail and online. This demonstrates that the most popular game of 2009 was also the most pirated, and more importantly, that the actual number of downloads for the most popular game is now almost three times as high as in 2008, signaling the explosive growth of piracy. It is also interesting to note that while another game sold around 300,000 copies on PC and had 4.1 million pirated downloads, the console version sold in excess of 6 million copies during the same period, and yet had a fraction of the number of pirated downloads at around 970,000. This illustrates that the PC is the most popular platform for ripping games.

Game piracy is not being conducted on a small scale; it is clearly substantial. Pirated copies are easily and widely available; some games even up to a year old can have up to a hundred active torrents through which someone can obtain the game. More popular/desirable games are pirated more heavily than less popular games. The entire top 10 pirated games list doesn't contain any truly unpopular games, indeed some of the most popular good quality games of 2010 appear on the list. Similarly when searching torrents, research shows more popular games have far more individual torrent listings than less popular games. This clearly contradicts the industries claims that "good games get pirated less"—we see more and more evidence that good games get pirated more.

Finally, on the contentious topic of DRM, the presence of intrusive DRM appears not to increase piracy of a game. For example a number of games all have no intrusive DRM whatsoever. These games use basic SafeDisc copy protection with no install limits, no online activation, and no major reports of protection-related issues. Yet all were pirated heavily enough to have the dubious distinction of being in the Top 10 downloaded games list. But strangely absent from the list are several popular games which do use more intrusive DRM. This indicates quite clearly that intrusive DRM is not the main reason why some games are pirated more heavily than others. It's very clear even with the industries best efforts to secure gaming content, theft is still uncontrollable. New systems and ways of protecting digital content are needed before games suffer the same debilitating effects the music industry has seen with piracy.

Reference Material Content

Reference material content can include but is not limited to medical records, literature and other secure documents. Reference material content is growing in volume (e.g., medical records) and poses a problem in that it is difficult to securely transport this large and valuable information. While reference material content does not necessarily consume the massive amount of storage space as entertainment content, for security issues it may not be desired to be on-line. Moreover, not everyone has access to a broadband connection and some information repositories cannot be securely or legally linked (e.g., when two different medical entities do not comply with the health information portability and accountability act (HIPAA)).

Network security issues pose a huge problem for transporting medical records. Unlike, for example, the banking industry whereby financial institutions can operate their own internal secure data networks and externally perform secure wire transfers, there is a proliferation of independent medical providers that all need to share medical record data. Today's medical records are not just "charts", they can include digitized text, video, or other digital content information. Data files may be extremely large. HIPAA requirements prevent independent practitioners from exchanging this information. Some of the systems, methods, and apparatus discussed herein provide means for this data to be transported securely by the patient and not over the internet thereby eliminating the need for independent practitioners to be linked. If desired, a higher level of security can be added through patient biometric information.

The broadband internet provides virtually limitless access to a plethora of information. There are limitations and issues, however, with this access. By definition, you need to be on-line to access the information. Not only do many areas of the world not have reliable access, a large segment of the population in areas that do, cannot afford to connect to the web. In a teaching situation or with minors the on-line internet can provide access to information that is undesirable or unaudited. Some of the systems, methods, and apparatuses described herein can serve up large amounts of reference information without the need to be on-line. This information can be loaded and controlled by the administrator. It is also available any place at any time.

Some of the systems, methods, and apparatuses discussed herein afford for securely transporting large amounts of sensitive data without using the internet. These systems, methods, and apparatuses can provide for both sending and receiving authentication ensuring that material can only be accessed at authorized sending and receiving locations. Biometric authentication is also available. Access to large amounts of data can be available any place and any time without the need for connection to the web. Content can be managed and tracked through these systems, methods, and apparatuses both on-line and at a fulfillment system.

Whether it's a movie, music or a PC game piracy affects the entire multi-media marketplace. It's an issue that needs a solution and an immediate fix for the entertainment industry to survive. One way to fix the problem is to look at the entire system of content delivery, use cutting edge new encryption technology and create a new content delivery model that in some examples doesn't touch the internet. More importantly whatever system is created should take into consideration the customer. Some of the systems, methods, and apparatuses discussed herein provide a way to give customers the feeling of unlimited content that is secured through hardware based encryption and hardware authentication. It's a way to finally monetize the content delivery market with subscription revenue, a system free from content theft and a system that opens up large content catalogs to consumers around the world. Some of the systems, apparatuses and methods discussed herein achieve these goals without internet, without downloading, without streaming and with a low cost for consumers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, apparatus, systems, and methods for securely delivering individualized, digital content, in certain examples large quantities of content (e.g., terabytes, etc.), to a plurality of users.

Figure 1:
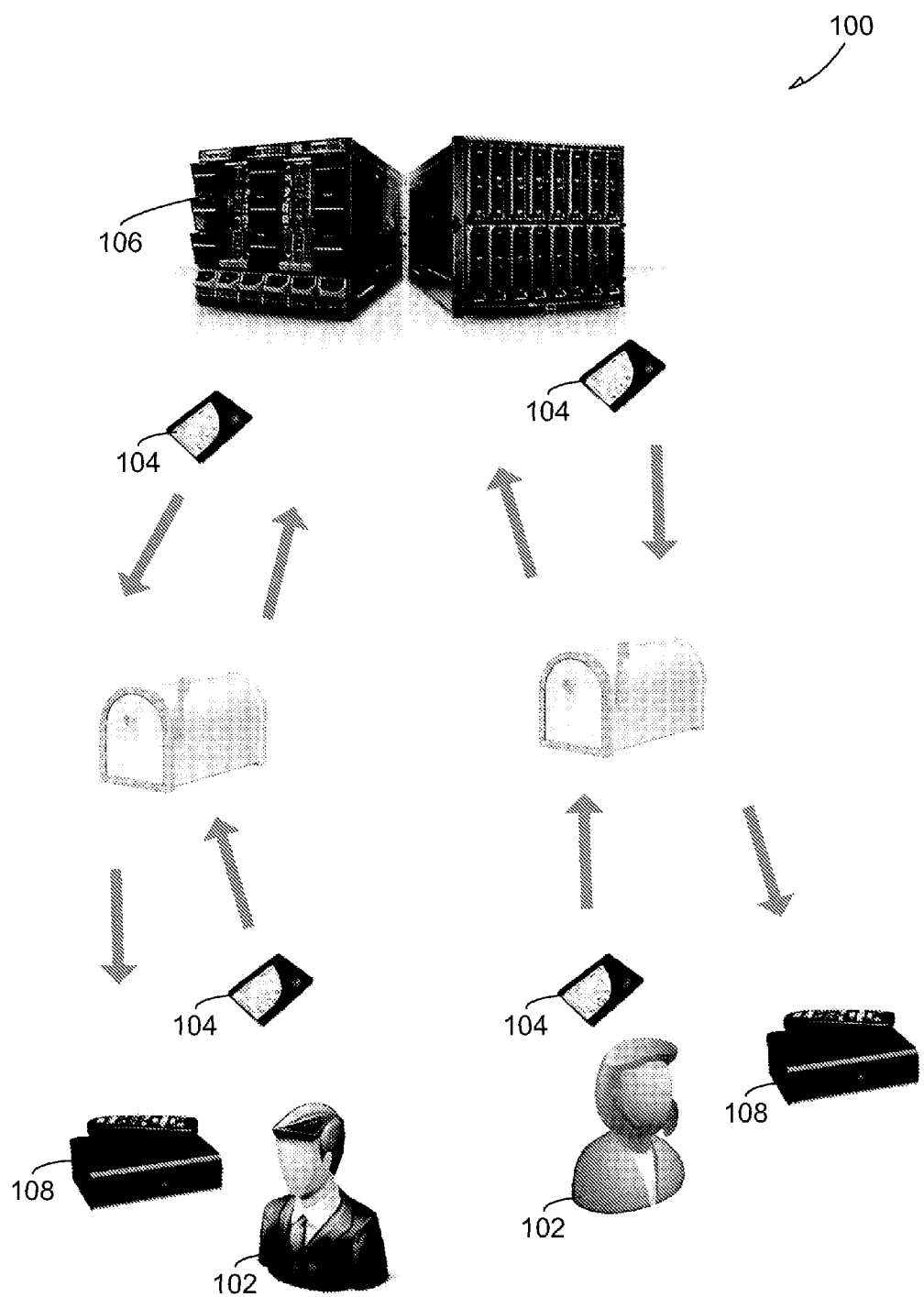
FIG. 1 illustrates generally an example of a system for digital content distribution and management.

FIG. 1 illustrates generally an example of a system 100 for digital content distribution and management. In some examples, the system 100 can provide secure, individualized, digital content to a plurality of users 102. The digital content can be provided to a user 102 on a memory device 104. The user 102 can select one or more items of digital content for loading on the memory device 104, and the selected digital content can be loaded on the memory device 104 by, for example, a fulfillment system 106. Once the digital content is loaded onto the memory device 104, the memory device 104 can be physically sent to the user 102. In an example, the memory device 104 can be physically sent to the user 102 via a public or private mailing service or other means. Upon receiving the memory device 104, the user 102 can couple the memory device 104 to a dock 108. The dock 108 can enable the user 102 to access the content stored on the memory device 104. In an example, the user 102 can purchase the dock 108, and can be provided access to digital content on one or more memory device 104 for a recurring fee (e.g., a monthly fee, etc.). In other examples, the user 102 can be provided access to the dock 108 and the digital content on one or more memory device 104 for a recurring fee.

Once the user 102 has accessed the content and completed use of the content and the memory device 104, the user 102 can physically send the memory device 104 back to the fulfillment system 106. The user 102 can also select additional content to be sent to the user 102 on a future memory device 104. The fulfillment system 106 can receive the returned memory device 104 and can reload the memory device 104 with content for another user 102. Additionally, upon receiving the additional content selections from the user 102 and, in some examples, upon receiving the memory device 104 back from the user 102, the fulfillment system 106 can load the same or another memory device 104 with the additional content for the user 102.

In an example, the memory device 104 and/or the content on the memory device 104 can be encrypted such that the content can be accessed by one or more docks 108, but access to the content by other devices or persons is limited. In some examples, the encryption can be used to securely associate the memory device 104 and/or content to one or more specific docks 108 such that the one or more specific docks 108 are the only docks 108 that can access the content on the memory device 104. Accordingly, in some examples, the content on the memory device 104 is secured from being accessed by people other than the users 102 associated with a user account corresponding to the one or more specific docks 108. In an example, a user account includes an account set up with the fulfillment system 106 for access of content, the user account having one or more users 102 associated therewith.

In some examples, this specifically associated encryption is accomplished with a unique key. Notably, the memory device 104 and/or content can only be accessed by a device having a unique key, and the unique key can be incorporated into the one or more docks 108 to which the content and/or memory device 104 are securely associated. In an example, the unique key is not used in docks 108 other than the one or more docks 108 to which the content and/or memory device 104 are securely associated. Accordingly, the one or more docks 108 can be the only docks 108 that have access to the unique key to decrypt the content/memory device 104.

For example, docks 108 can be manufactured such that each dock 108 has a unique key incorporated therein. In some examples, an individual dock 108 can be the only dock 108 having a given unique key incorporated therein. In other examples, a unique key can be incorporated into a subset of docks 108 and this subset of docks 108 can have a restricted distribution such that the subset of docks 108 are provided to, for example, the same user account for the system 100. Accordingly, a given unique key is used by, for example, a single user account only and that unique key can be incorporated into the one or more docks 108 associated with (e.g., used by) the single user account. Moreover, in some examples the encryption of the memory device 104 can be hardware based encryption which encrypts the entire memory device 104 as described in more detail below. Advantageously, the unique key can be used to make it more difficult to make unauthorized copies (e.g., rips) of content on the memory device 104.

Additionally, in some examples the docks 108 can be secure devices. For example, a unique key incorporated in a dock 108 cannot be accessed from the dock 108 in an unauthorized manner. In certain examples, the dock 108 has only one or more display output (e.g., HDMI output, DisplayPort output, or one or more other standard or high definition outputs), otherwise restricting access to the data on the memory device 104.

Accordingly, the system 100 can be used to widely distribute content to any number of users 102, while protecting the content from unauthorized copying. For example, each memory device 104 can be securely associated with one or more specific docks 108 as discussed above with a unique key. Accordingly, even if one of the unique keys were somehow cracked or discovered, the unique key would provide access only to content on the memory devices 104 associated with the cracked or discovered unique key. The content sent to other docks 108 on other memory devices 104 would remain secure. Moreover, content sent to a first user 102 on a memory device 104 for decryption by a first subset of one or more docks 108 associated with the first user 102 cannot be accessed by a second user 102 that has access to a second subset of one or more other docks 108, but does not have access to the first subset of one or more docks 108. Notably, the system 100 can also make the content difficult to copy since, in some examples, the content is not stored (other than temporary storage during streaming) in any location other than on the memory device 104 in an encrypted form. The content is stored on the encrypted memory device 104 and can be streamed from the memory device 104 to external devices for use.

Content for loading onto a memory device 104 can include any type of digital data. Example content includes movies, music, medical information, business documents, reference material, software, video games, textbooks, videos, lectures, manuals, medical records, product information, E-commerce site displays, etc.

Figure 2:
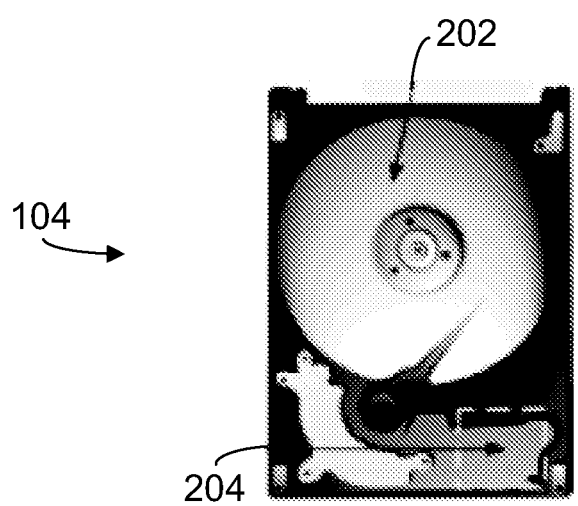
FIG. 2 illustrates generally an example of a memory device of the system of FIG. 1.

FIG. 2 illustrates an example a memory device 104 for storing content for access by a dock 108. The memory device 104 can include a storage medium 202, and an access system 204 for accessing data on the storage medium 202. The memory device 104 can comprise a hard disk drive, solid state drive, flash drive, CD, DVD, or other storage medium.

In some examples, the memory device 104 can be encrypted with full disk encryption such as in the Seagate DriveTrust™ system. Here, for example, the access system 204 can encrypt all data that is sent to the storage medium 202 and can decrypt all data from the storage medium 202 to external devices (e.g., a dock 108). The access system 204 is the only authorized means for accessing data on the storage medium 202, and the access system 204 can only allow access to the storage medium 202 if an external device has the correct key to unlock the memory device 104. For example, during boot up of the access system 204, the access system 204 can authenticate with the external device by comparing a cryptographic hash of a unique key with a unique key provided by the dock 108. If the unique key provided by the dock 108 matches the cryptographic hash, the authentication is successful, the access system 204 provides access to onboard software and a storage medium 202 of the memory device 104. If the unique key provided by the dock 108 does not match the cryptographic hash, the authentication is not successful, the access system 204 fails to boot and the content on the storage medium 202 remains encrypted and inaccessible.

In some examples, the key used by the access system 204 to provide access to the storage medium can comprise a unique key as described above. For example, the content in the storage medium 202 can be encrypted with a first key. In an example, the memory device 104 comprises a Seagate Momentus™ 7200 full disk encryption (FDE) with FIPS 140-2 Encryption.

Figure 3:
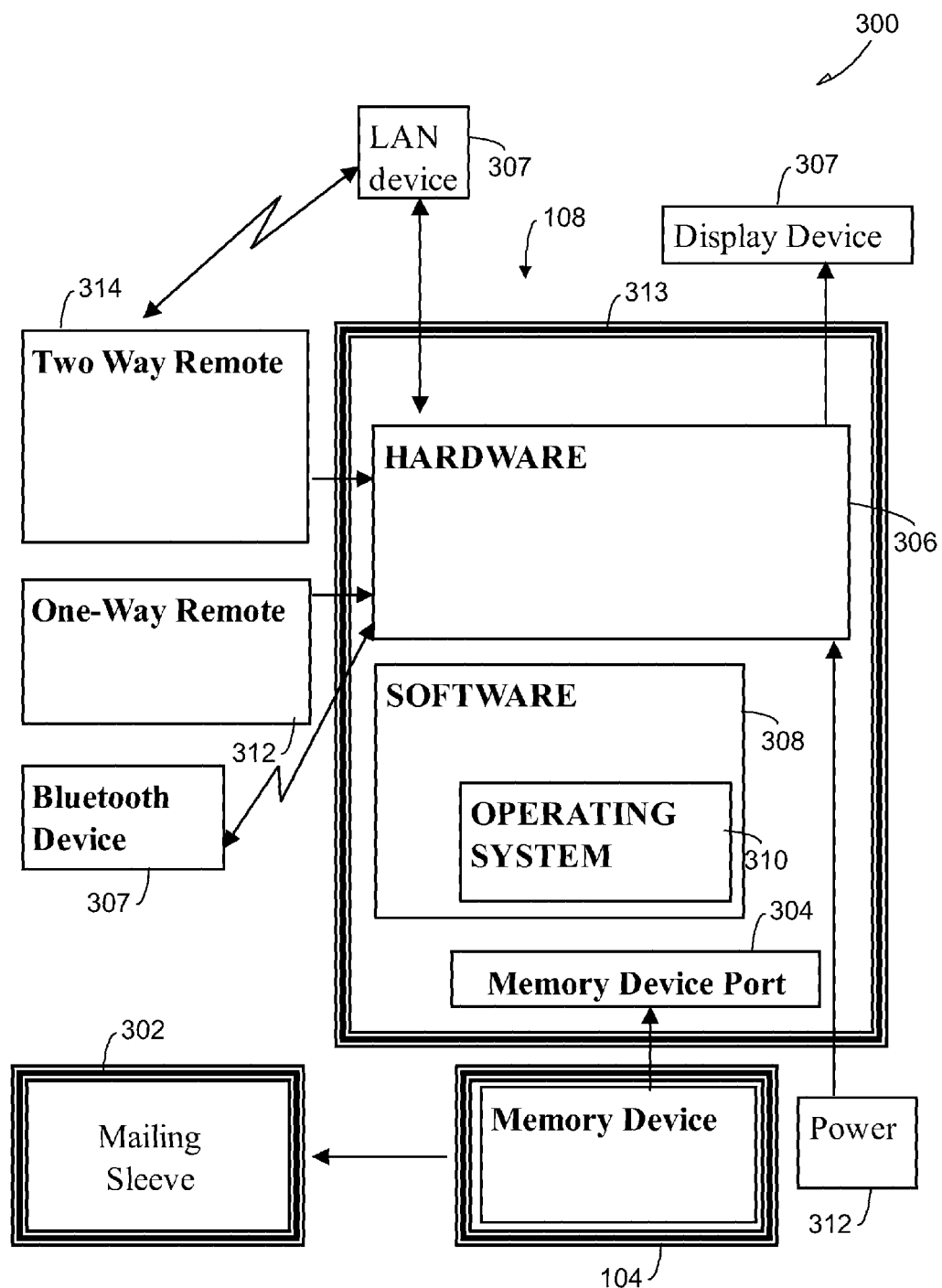
FIG. 3 illustrates generally an example block diagram of a dock, a memory device, and external devices.

FIG. 3 illustrates generally a block diagram of an example content management system 300 including a dock 108 and a memory device 104. As described above, the memory device 104 can be received in a mailing sleeve 302 and can be coupled with the dock 108 via a port 304. In an example, the port 304 can include a serial ATA (SATA) port and the port 304 can support hot-swapping of memory devices 104. The dock 108 includes hardware 306 for accessing the content on the memory device 104 and for passing the content to an external device 307 (e.g., a monitor, TV, computer, wireless phone). The hardware 306 can include a processing device coupled to a memory having software 308 stored thereon for execution by the processing device. The software 308 can cause the processing device to implement an operating system 310 to control operation of the dock 108 and interaction with a user 108. The operating system 310 can control access of content from the memory device 104, as well as the sending and/or receiving of content from external devices 307. The dock 108 can include a power port 312 for receiving operating power from, for example, a line AC power source. The hardware 306 can also include a graphics card for rendering videos and/or images on an associated external device 307 (e.g., a display device such as a TV).

In some examples, the dock 108 includes ports for communicative coupling of external devices 307. These ports can include a HDMI, USB, Ethernet, IR, VGA. In some examples, the dock 108 can also communicate with external devices 307 wirelessly. For example, the dock 108 can use Bluetooth, IEEE 802.11, or other wireless communication techniques.

As mentioned above, in some examples, the dock 108 has a unique key stored therein. The dock 108 can also include a tamperproof case 313 to prevent someone from tampering with the dock 108 in an attempt to access the unique key. The tamperproof case 313 can substantially surround the hardware 306 or can substantially surround specific hardware components in order access the unique key. In an example, the unique key can be rendered un-obtainable (e.g., destroyed, erased) when the tamperproof case is breached. The tamperproof case 313 can include any type of tamperproof case, such as an electro-mechanical or an electro-optical tamperproof case.

In some examples, the dock 108 can receive communications from a one-way remote 312. The one-way remote 312 can receive input from a user 102 and provide commands to the dock 18 to, for example, control which content is accessed from the memory device 104 and provided to external devices 307. In some examples, the dock 108 can also send and receive communications with a two-way remote 314. The two-way remote 314 in addition to receiving input from user 102 can receive information from the dock 108 in order to, for example, provide information to the user 102 (e.g., in a built-in display). In an example, the one-way remote 312 or two-way remote 314 can have standard remote keys on one side and a keyboard (e.g., QWERTY keyboard) on the opposite side. Here, the remote control 312, 314 can include a gyroscope or other sensor to determine an orientation of the remote control 312, 314. The gyroscope can include a single axis gyroscope and a multi-axis gyroscope. When the side of the remote control 312, 314 with the standard remote keys is upwards, that side with the standard remote keys is enabled and the keyboard side is disabled. Likewise, when the keyboard side is upwards the keyboard is enabled and the standard remote keys are disabled. In an example, which side of the remote is enable is user selectable (e.g., with one or more keys on the remote). Accordingly, the remote control 312, 314 can provide both standard remote functions and a keyboard for providing commands and information to the dock 108.

In some examples, the dock 108 can stream content from the memory device 104 to external devices 307. In an example, the content is streamed wirelessly (e.g., using IEEE 802.11) to local external devices 307. In an example, the dock 108 uses its unique key to access the content on the memory device 104, and provides the content to the external device 307 such that the external device 307 does not need the unique key. The stream between the dock 108 and the external device 307, however, can still be encrypted (e.g., using a shared key encryption).

In an example, the dock 108 can limit the speed (e.g., amount of data per time) of the stream that is provided to one or more external devices 307. In an example, the speed limit can be based on a speed that the data is to be provided to a user 102. For example, some items of content (e.g., a movie, song) are to be displayed, produced, or otherwise provided in a sequence over a certain time interval. In these situations, the speed can be limited to at or near the speed at which the data is to be provided to a user 102. For example, content corresponding to a movie could be provided to the external device 307 at or near the speed that the content is to be rendered on a display at the external device 307. Accordingly, even if the external device 307 could support higher speeds of data transfer, the data transfer speed could be limited. Limiting the speed of streaming can reduce the likelihood of the content being used in an unauthorized manner, because even if someone identified a way to make unauthorized copies of the stream, they would be limited to copying the data at a slower speed. Accordingly, the appeal of copying the stream may be lessened since it would take long periods of time to copy large amounts of data.

Moreover, in some examples, a stream sent from the dock 108 can be provided in a secure form. For example, a stream sent over a wireless link can be encrypted using a shared key. Additionally, a stream sent over a high definition link (e.g., HDMI) can be encrypted using high bandwidth digital content protection (HDCP). In an example, all of the stream(s) sent from the dock 108 are sent in a secure form. Accordingly, in an example, the dock 108 can output content to external devices 307 via one or more display outputs only (e.g., HDMI), and the content can be encrypted using HDCP. Moreover, in an example, the content can only be sent to external devices through one or more display outputs and the data speed is limited as described above.

In an example, the dock 108 can include a web-server such that the external devices 307 can communicate with the web-server to control access to the content on the memory device 104. Accordingly, the dock 108 can be web-enabled and the external devices 307 can have an interface to access a catalog of the content on the memory device 104. The dock 108 can then accept transactions (e.g., requests) from the external device 307 and stream the selected content to the external device 307. Additionally, the external device 307 can also perform account management (e.g., selection of new content, user profile changes, subscription changes, etc.) through the dock 108. For example, the external device 307 can send information regarding account management to the dock 108 and the dock 108 can store the information on the memory device 104, such that that when the memory device 104 is returned, the account management information is received and action is taken by the fulfillment system 106 accordingly. In another example, the dock 108 can have access to the internet (e.g., through a phone line or high speed connection) and the external device 307 can access the account of the user 102 online using the internet connection of the dock 108. The external device 307 can then update the account management directly through the dock 108. In yet another example, the dock 108 can act as a wireless access point where the external device 307 can connect to the internet for general surfing through the dock 108 using the dock's 108 connection to the internet. In other examples, the connection to the internet through the dock 108 can be limited, for example, by limiting the connection to account management and other dock 108 related activities.

In one example, a first external device 307 (e.g., a computer coupled to the dock 108 wirelessly) can send content selections to the dock 108, such that the dock 108 can send the content corresponding to the content selections to a second external device 307 (e.g., a TV connected to the dock 108 with a HDMI cable). Accordingly, the first external device 307 can select, for example, a movie from a catalog displayed on the first external device 307. The dock 108 can receive the selection and send the selected movie to the second external device 307 for display thereon. In an example, an external device 307 can include a multi-touch device.

In some examples, the dock 108 is a standalone device that is, for example, configured to be placed in an entertainment center near a TV. In other examples, the dock 108 is configured to be embedded into other devices (e.g., a vehicle, computer, cell phone). Here, the memory device 104 can be coupled with the dock 108 and the dock 108 can provide the content to the other device and/or an output device (e.g., display, speaker) on the other device. For example, the dock 108 can be configured to be embedded into a digital movie projector for projection in a theatre. Accordingly, the producers of movies can send memory devices 104 having a movie thereon and the memory device 104 can be protected using a unique key corresponding to one or more docks 108 in one or more specific digital projectors. In other examples, the dock 108 can be embedded into a display device (e.g., a monitor or TV). Accordingly, a dock 108 could be located external to a device and have the port 304 accessible on an external portion of the device. Accordingly, a user 102 can couple a memory device 104 to the port 304 on, for example, display device and the embedded dock 108 can access the content on the memory device 104 and provide the content to the display device for display thereon.

In an example, the dock 108 includes a TV tuner coupled to, for example, a coaxial input for receiving broadcast TV signals and providing those signals to an external device. The dock 108 can, therefore, receive broadcast TV signals (e.g., from an antenna) and tune the signals using the TV tuner and provide the TV signals to an external device.

Figure 4:
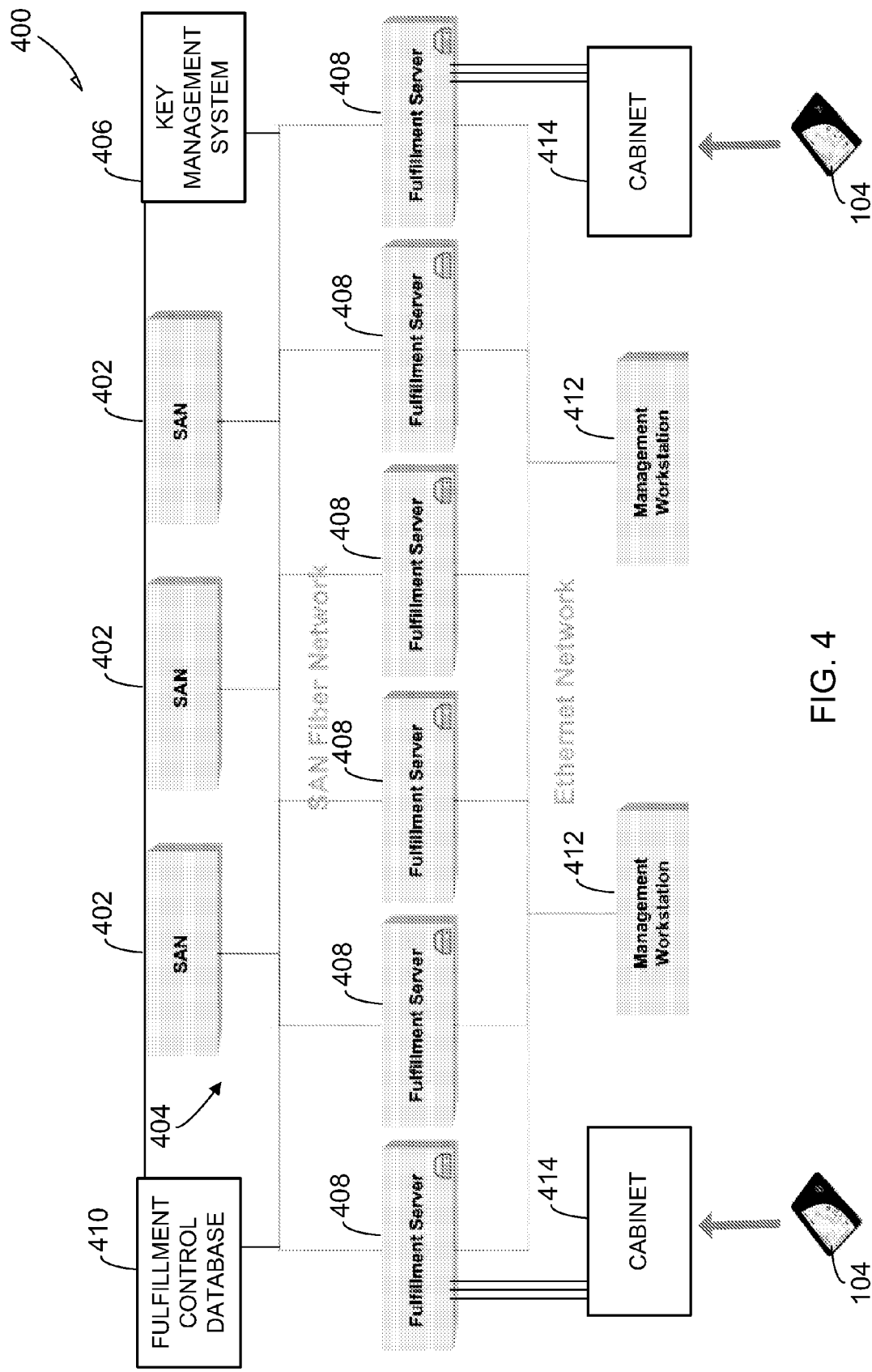
FIG. 4 illustrates generally an example of a fulfillment system.

FIG. 4 illustrates generally an example of a fulfillment system 106 for loading content onto a memory device 104. The fulfillment system 106 includes one or more storage area networks (SANs) 402, a fiber network infrastructure 404, an enterprise key management system 406, one or more fulfillment servers 408, a fulfillment control database 410, one or more management workstations 412, and one or more drive cabinets 414 for coupling to memory devices 104.

In an example, a storage area network (SAN) 402 comprises a multiple controller implementation optimized to maximize read speeds of large files. Content can be spread as wide as a possible across all arrays of the SANs 402 in order to facilitate maximum spindle throughput. In an example, the SANs 402 can be natively coupled to a fiber network.

The one or more fulfillment servers 408 can be coupled to one or more cabinets 414. The one or more cabinets 414 can be configured to couple to and house one or more memory devices 104. A fulfillment server 408 can have a multi-threaded application installed that manages the loading of memory devices 104 and maintains content selection processing workflow. The application can communicate with the fulfillment control database 410 which implements a queue containing a list of memory devices 104 that are authorized for being prepared. The application on the fulfillment server 408 can search for an available (e.g., empty) slot in a cabinet 414. When an available slot is identified, the application can access a list of content that is authorized to be loaded onto a memory device 104 from the queue on the fulfillment control database 410. The fulfillment server 408 can then begin copying content from the SANs 402 to the memory device 104.

In an example, an operator of the fulfillment system 106 can, on a scheduled basis, initiate a request to forecast the most used items of content in the next schedule period. The forecast can create a list of content that can be used to pre-load one or more memory devices 104 at one or more fulfillment servers 408. The forecast can be based on a history of previously selected and/or accessed content. The pre-loaded memory devices 104 at a fulfillment server 408 can be used to cache the forecasted items of content locally to limit the most frequent redundant utilization of the fiber network infrastructure 404. Accordingly, by storing some (e.g., commonly used) items of content locally at a fulfillment server 408, the items can be loaded onto a memory device 104 from, for example, another memory device 104 and does not need to use bandwidth of the fiber network infrastructure 404 to download the items from the SANs 402 each time they are used to load a memory device 104. In an example, the management workstations 412 can access the fulfillment control database 410 to view status, errors, maintenance of the fulfillment servers 408. The management workstations 412 can also provide content selection queue override functionality and system analytics and reporting. In some examples, the fulfillment system 106 can be automated by conveyors, robotics, and other automation systems.

In an example, the content can be stored on the SANs 402 in an encrypted form. For example, an item of content can be stored encrypted with a shared key. Moreover, different items of content can be encrypted with different shared keys. In an example, a shared key is a key that is provided to a plurality of different users 102 of different user accounts and/or provided to a plurality of docks 108 associated with different user accounts. Accordingly, a single shared key can be used to encrypt an item of content and this encrypted item of content can be provided to multiple different docks 108 associated with multiple different user accounts where each user account can have access to the shared key and can used the shared key to decrypt the encrypted item of content. Accordingly, the items of content can be loaded onto the memory devices 104 as encrypted items without having to encrypt the items in real-time before loading on the memory device. Since the items are encrypted with shared keys, an item of content encrypted with a given shared key can be loaded onto multiple memory devices 104 and sent to multiple different users 102 and docks 108. Each user 102 and dock 108 can access the item of content by being provided with the shared key corresponding to the item of content.

The SANs 402 can also store the shared keys associated with each item of content such that the shared keys can be provided to fulfillment server 408 for storing onto the memory device 104. In an example, this shared key encryption of the items of content can be in addition to the unique key protection of the memory device 104. Accordingly, a memory device 104 can be loaded with content, wherein the content itself encrypted using shared keys and different items of the content are encrypted with different shared keys. Moreover, once the content has been loaded on the memory device 104, the memory device 104 can be encrypted using a hardware based encryption as described above with a unique key corresponding to one or more docks 108.

Figure 5:
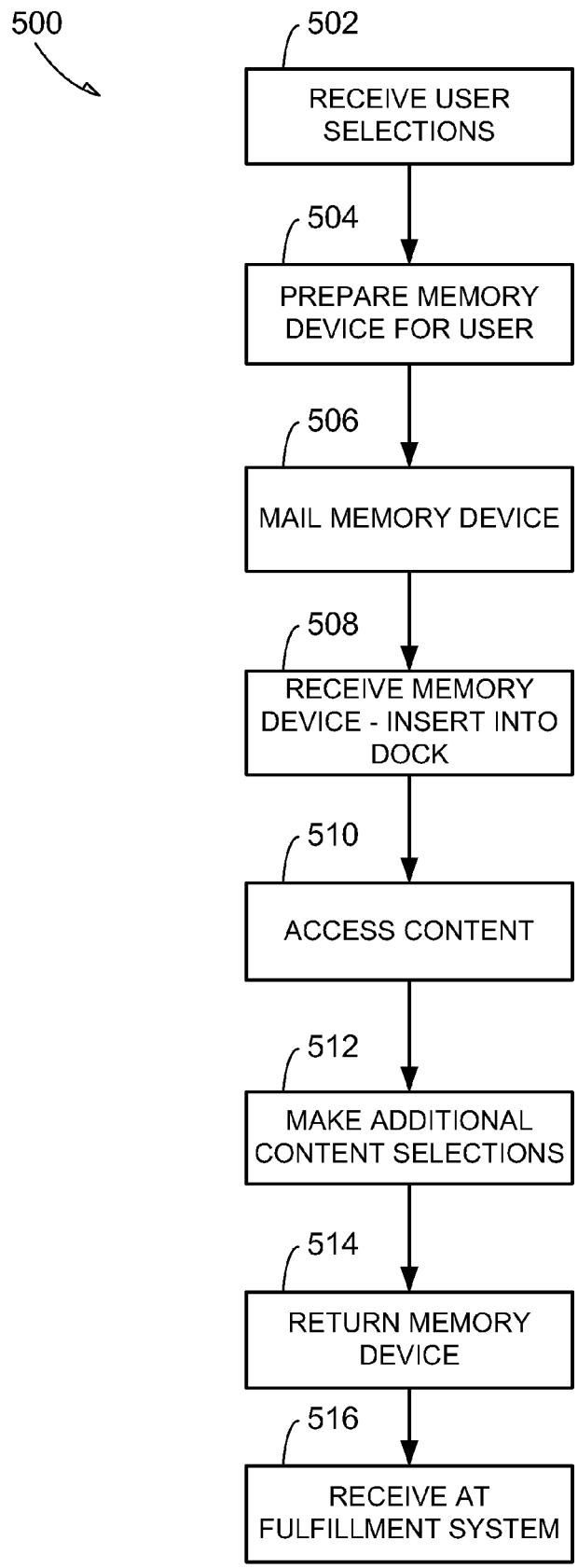
FIG. 5 illustrates generally an example of a method for digital content distribution and management.

FIG. 5 illustrates generally an example method 500 for digital content management and distribution. Method 500 can provide a means to securely provide content to a plurality of users 104.

At block 502, a user 102 can select content for loading onto a memory device 104. In an example, the content can include movies, music, and video games in which the user 102 is provided access to for a fee. Accordingly, in some examples, the content is stored in one or more central locations having a fulfillment system 106 that can load the content onto one or more memory devices 104 and provide the content to the user 102. The user 102 can select the content using any suitable means to get the selection information to the fulfillment system 106. For example, the user 102 can make the selections on a webpage, over the phone, or by mail. In some examples, the selections can be stored on a previously used and returned memory device 104, such that when the memory device 104 is returned to the fulfillment system 106, the fulfillment system 106 can extract the selection information from the memory device 104.

In an example, the user 102 can access a webpage to select content therefrom. The webpage can include lists of content organized in an appealing manner. In addition, some content can include an interactive "person" to discuss the content in order to provide information to the user 102 to aid in their selection. For example, if the user 102 is selecting music, a virtual representation of the artist that produced the music can appear on the webpage and discuss their music.

At block 504, once the fulfillment system 106 receives the selection information from the user 102, the fulfillment system 106 loads one or more memory devices 104 with the selected content. In an example, a memory device 104 comprises a large amount of space for storing content such that multiple items of content can be stored on a single memory device 104. Accordingly, multiple different items individually selected by a user 102 can be stored on a memory device 104.

In an example, the content loaded onto the memory device 104 is encrypted. In an example, the content is encrypted with a shared key and different items of content can be encrypted with different shared keys. Accordingly, the content can be stored in a database (e.g., on SANs 402 of the fulfillment system 106) in an encrypted form and loaded on the memory device 104 in the encrypted form. In some examples, the key or keys corresponding to the content loaded onto the memory device 104 can also be loaded on the memory device 104. This key or keys can be encrypted with another key. Advantageously, if different items of content on the memory device 104 are encrypted with different keys, even if someone were to gain improper access to the memory device 104, a separate key would have to be cracked to gain access for each differently encrypted item of content. Moreover, in some examples a single item of content can be divided into sections with each section encrypted using a different key.

Once the fulfillment system 106 is authorized to prepare a memory device 104 with content for a user 102 (e.g., by receiving a returned memory device 104 from the user 102), the fulfillment system 106 can select a memory device 104 to prepare with content for the user 102. Additional detail regarding authorization to prepare a memory device 104 is provided with respect to block 516 below.

First, the fulfillment system 106 can match a user 102 with content for the user 102. The content for the user 102 can be content selected by the user 102 and/or extra content 708 added by the fulfillment system 106. The fulfillment system 106 can record user selections as they are received (e.g., from returned memory devices 104, internet selections, etc.) and when the fulfillment system 106 is authorized to prepare a memory device 104 for the user 102, the fulfillment system 106 can load a memory device 104 with content based on the user selections. To prepare a memory device 104 for a user 102, the fulfillment system 106 can select a memory device 104 to be prepared. In an example, the fulfillment system 106 can select an open memory device 104 and load content thereon corresponding to the user 102.

In some examples, the fulfillment system 106 can preload memory device 104 with content, such that the content can be loaded onto a memory device 104 prior to receiving authorization to prepare a memory device 104 with content for the user 102. Advantageously, pre-loading a memory device 104 can reduce the time require to prepare a memory device 104 for shipping. In an example, memory devices 104 can be pre-loaded with popular content such as content corresponding to a particular category (e.g., songs by a particular artist). Accordingly, if the user 102 selects content that matches content on a pre-loaded memory device 104, the fulfillment system 106 can select a memory device 104 having the pre-loaded content thereon for preparing for a user 102. If the user selections do not match content that is pre-loaded onto a memory device 104, an open memory device 104 can be selected for preparation. In some examples, the user selections can be received by the fulfillment system 106 prior to authorization of preparing a memory device 104 for the user 102. For example, the user 102 can select content for adding to a memory device 104 via a webpage, but authorization may wait until a memory device 104 is returned from the user 102. Here, the fulfillment system 106 can pre-load a memory device 104 with content based on the users selections. Accordingly, when authorization is received to prepare the memory device 104, all or a portion of the content for the user 102 may already be loaded onto the memory device 104. If the fulfillment system 106 is able to utilize a pre-loaded memory device 104, the fulfillment system 106 can, if space is available on the memory device 104 add additional content to the pre-loaded content.

Once a memory device 104 is loaded with content for a user 102, the fulfillment system 106 can encrypt the memory device 104 for decrypting by one or more docks 108 associated with the user 102. In an example, the one or more docks 108 have a unique key associated therewith and the fulfillment system 106 can provide the memory device 104 with the unique key corresponding to the one or more docks 108 such that memory device 104 can secure the content using the unique key as described above. In an example, the unique key is linked to the user 102 by a database stored at the fulfillment system 106. In an example, the docks 108 are manufactured with a unique key therein, and the unique key is not, (or not easily) accessible once manufacture of the dock 108 is complete. Each dock 108 can have a dock code (e.g., a serial number) and the fulfillment system 106 can maintain a database of each manufactured dock 108 and link between the dock code and the unique key associated with the dock 108. Accordingly, when a user 102 obtains a dock 108, the user 102 can notify the fulfillment system 106 of the dock code for the dock 108 obtained (e.g., through a registration process). The fulfillment system 106 can then store the link between the user 102 and the dock 108/unique key. Accordingly, when preparing a memory device 104 for a user 102, the fulfillment system 106 can provide the memory device 104 with the unique key corresponding to the dock 108 of the user 102 for securing the memory device 104 with the unique key.

In an example, the user 102 can obtain multiple docks 108, for example, to have docks 108 in multiple locations throughout a place of residence, or in multiple different residences. In an example, each of the docks 108 obtained by the user 102 can have the same unique key associated therewith. Accordingly, a memory device 104 protected with the unique key can be accessed by each of the docks 108 having that unique key. Since the unique key for a dock 108 is unknown to the user 102 and the unique key for a dock 108 cannot be modified (or easily modified) once the dock 108 has been manufactured, the user 102 should ensure that each of the multiple docks 108 obtained has the same unique key. This can be ensured by obtaining all docks 108 from a single source where the multiple docks 108 were manufactured as a set, or this can be ensured by requesting one or more docks 108 be manufactured with a unique key matching the unique key associated with the dock code of a dock 108 already obtained by the user 102.

At block 506, once a memory device 104 is prepared with content for a specific user 102 and protected with a unique key corresponding to one or more docks 108 of the specific user 102, the memory device 104 can be physically delivered to a user 104. As mentioned above, this physical delivery can occur via any type of delivery such as public mail, private service, user pickup, etc.

At block 508, the user 102 can receive the memory device 104 and couple the memory device 104 to a dock 108. In some examples, the dock 108 can include a slot that can accept the memory device 104 therein. Here, the memory device 104 can be coupled to the dock 108 by inserting the memory device 104 into the slot and having a port on the memory device 104 contact a port on the dock 108.

As mentioned above, the dock 108 can have a unique key associated therewith and the memory device 104 can be protected with a unique key. When the memory device 104 is coupled to the dock 108, the dock 108 can provide the unique key to the memory device 104 in an attempt to access the content on the memory device 104. If the unique key of the dock 108 matches the unique key (or a cryptographic hash of the unique key) of the memory device 104, the memory device 104 can be unlocked such that the dock 108 can access the content on the memory device 104.

As mentioned above, in some examples in addition to the unique key encryption of the memory device 104, items of content on the memory device 104 can individually encrypted. In an example, upon unlocking the unique key, the dock 108 can decrypt the encrypted shared keys corresponding to the items of content on the memory device 104. Accordingly, the dock 108 can decrypt the items of content on the memory device 104 with the shared keys as the items of content are accessed by a user 102.

At block 510, the user 102 can access content on the memory device 104. As the content is accessed, the dock 108 can provide the content to an external device 307 for use by the user 102. In some examples, the dock 108 can record user information as the content is accessed. The user information can include information regarding which content was accessed by a user 102. The recorded information can be stored on the memory device 104.

In some examples, the user 102 is able to purchase content to permanently own. The user 102 can provide a command to the dock 108 and (e.g., when payment has been verified), the dock 108 can provide an unencrypted form of the content to an external device 307 for storage thereon.

In an example, some content on the memory device 104 can be accessed prior to stop time, after which the dock 108 will not allow the content to be accessed. For example, the fulfillment system 106 can include a time stamp regarding the time (e.g., date, hour, minutes, etc.) that the memory device 104 was prepared (or finished being prepared) for the user 102, or the time the memory device 104 is to be sent to the user 102. The dock 108 can have a clock and can determine the amount of time since the memory device 104 was sent to the user 102. A stop time for the content can be determined based on a threshold length of time since the time stamp, the dock 108 can restrict access to the content on the memory device 104. The user 102 can then call in or otherwise contact a customer representative to extend/reset the stop time of allowable access for the memory device 102. Advantageously, restricting access to the content to prior to a stop time can encourage users 102 to return the memory devices 104 to the fulfillment system 106 for different memory devices 104. Additionally, restricting access can reduce the likelihood of a user 102 pretending to have a lost memory device 104 with the intent of accessing the content on the memory device 104 for a long period of time.

Furthermore, in some examples, some content on the memory device 104 can be loaded onto the memory device 104 and provided to a user 102, but the content is restricted from access until a certain time (referred to herein as an ("access time"). For example, for a release of a movie, the movie can be loaded onto a memory device 104 and provided to a user 102 prior to the release time, but the dock 108 does not provide the content to external devices 307 prior to the release time. Accordingly, content can be provided to users 102 prior to an access time and the content can be accessed by the users 102 on or after the access time.

In an example, the dock 108 can be remotely disabled. Accordingly, customer service or another entity can send a command to the dock 108 to instruct the dock 108 not to access content from any memory devices 104. This command can be sent over, for example, a phone line or through the internet to the dock 108.

At block 512, the user 102 can select additional content for receiving on a future memory device 104. In examples where the dock 108 has a communicative connection to the fulfillment server 400 (e.g., through an internet or phone connection), the dock 108 can provide the user selections to the fulfillment server 400 through this connection. In other examples, the dock 108 can store the user selections on the memory device 104 such that the fulfillment system 106 can receive the user selections when the memory device 104 is returned.

At block 514, the user 102 can return the memory device 104 to the fulfillment system 106. Once the user 102 has accessed all desired content on the memory device 104 and/or the user 102 would like to have another memory device 104 of new content, the user 102 can de-couple the memory device 104 from the dock 108 and physically return (e.g., mail) the memory device 104 to the fulfillment system 106. Notably, when the memory device 104 is encrypted with the unique key, de-coupling the memory device 104 from the dock 108 returns back to a locked state such that the content thereon cannot be accessed without the unique key.

At block 516, the fulfillment system 106 can receive the returned memory device 104 and, for example, authorize another memory device 104 to be prepared for the user 102. In some examples, the user 102 can be authorized access to the content with a subscription where the user 102, for example, pays a monthly fee. Additionally, the subscription can authorize the user 102 to have a certain number of memory devices 104 out from the fulfillment system 106 at a time. For example, a subscription can authorize a user 102 to have two memory devices 104 out at a time. Accordingly, when the user 102 has two memory devices 104 out, the fulfillment system 106 can authorize another memory device 104 to be prepared when one of the two memory devices 104 currently out are received at the fulfillment system 106. In other examples, the authorization to prepare a memory device 104 can be based on a new or updated order/subscription service placed by the user 102 or other schemes.

When the fulfillment system 106 receives a returned memory device 104, the fulfillment system 106 can match the returned memory device 104 with a user 102. In an example, the fulfillment system 106 can have a record matching a memory device 104 (e.g., by an external bar code or RFID chip) with a user 102. Accordingly, upon receiving a memory device 104, the fulfillment system 106 can determine a user 102 corresponding to the memory device 104. The fulfillment system 106 can then authorize another memory device 104 to be prepared for the user 104 if appropriate. Additionally, as mentioned above, in some examples, the memory device 104 is protected with a unique key that is linked with one or more docks 108 corresponding to the user 102. The fulfillment system 106 can also keep a record matching each user 102 to one or more unique keys. Accordingly, upon receiving a memory device 104, the fulfillment system 106 can match the memory device 104 to a unique key by matching the memory device 104 to a user 102 (e.g., a user account) and the user 102 to a unique key. The fulfillment system 106 can then access the memory device 104 to determine if there is any user information on the memory device 104. User information can include selections for future content, information regarding which content the user 102 accessed, user preference information (e.g., likes, dislikes, categories or tags of interest), product purchases, payment information, and other information. The fulfillment system 106 can then use the user information when preparing another memory device 104 for the user 102.

After accessing the user information on the memory device 104, the fulfillment system 106 can mark the memory device 104 as open for preparing for a user 102. To open the memory device 104, the fulfillment system 106 can remove, erase, or otherwise discard the unique key for use with the memory device 104. The fulfillment system 106 is then free to prepare the memory device 104 for another user as described above with respect to block 504.

Figure 7:
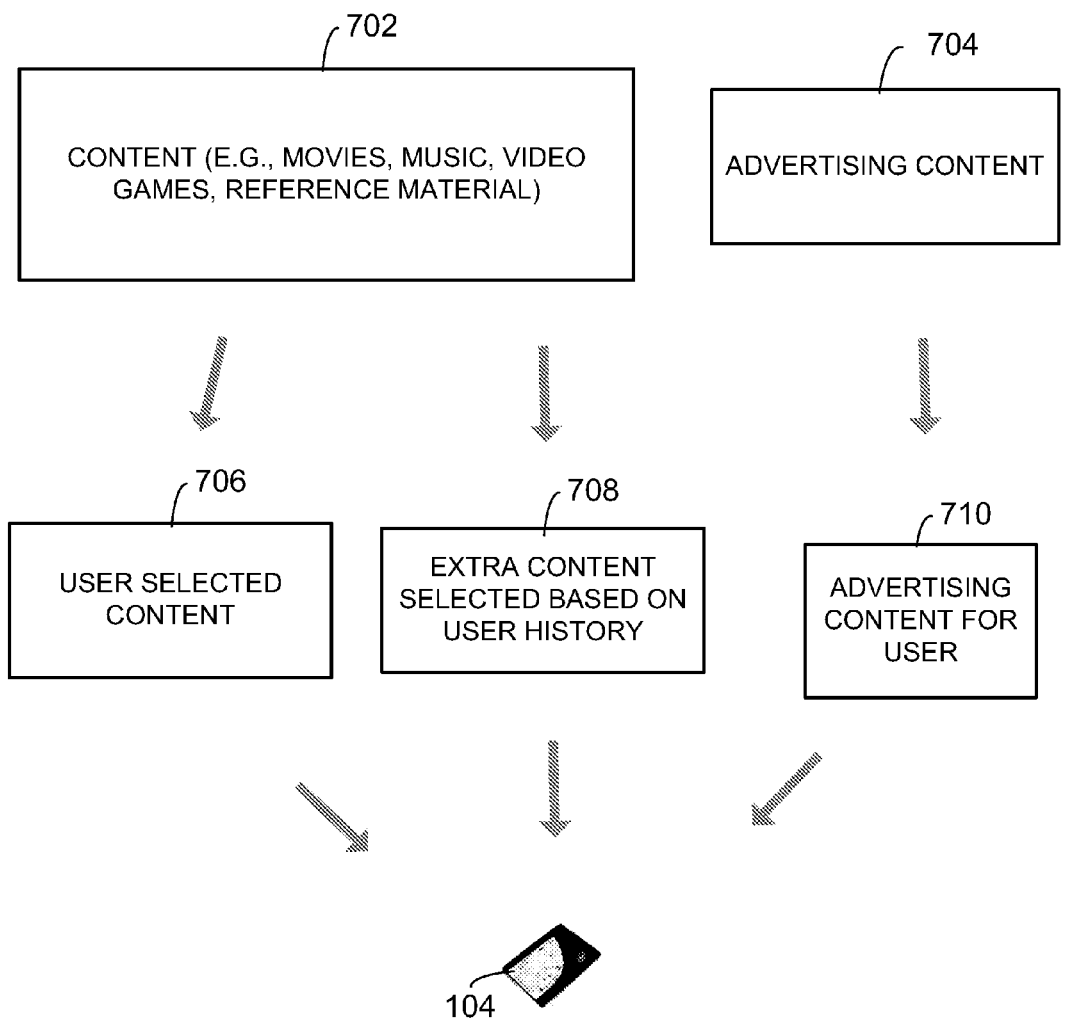
FIG. 7 illustrates an example of loading content from one or more content databases onto a memory device.

In an example, advertising content can be added to the memory device 104. In some examples, the advertising content can be based on the content selections or the content that is accessed by the user 102 similar to that described with respect to the extra content 708 at block 504. In some examples, the advertising content can be content selected by the user 102. For example, the user 102 can choose advertising content from a certain brand, a certain category (e.g., sporting goods), or of a certain type (e.g., comedy). FIG. 7 illustrates an example of advertising content 710 added to a memory device 104 from an advertising content database 704. As shown, the advertising content 710 can be added to the memory device 104 in addition to the user selected content 706 and the extra content 708 from the content database 702.

In some examples, product information (e.g., including services) for purchase or rent by the user 102 can be loaded onto the memory device 104. This product information can include information corresponding to one or more particular brands, manufacturers, or retailers. In an example, the product information can be accompanied by an E-commerce site display such that the product information can be displayed for the user in a format similar to that shown on a webpage listing the product(s). The user can then select a product for purchase and the product selection (purchase) information as well as payment information (e.g., credit card information) can be stored on the memory device 104. When the memory device 104 is returned to fulfillment system 106, the product selection information and payment information can be retrieved from the memory device 104 and forwarded to the appropriate retailer or vendor for purchase of the item. Accordingly, products can be securely purchased using the dock 108 and the memory device 104. Once coupled to the fulfillment system 106, the memory device 104 can have a product catalog stored thereon updated before being returned to the user 102.

In some examples, the user 102 may be required to access (e.g., view, read) a certain amount of advertising content based on a subscription fee paid for access to content. For example, there may be three levels of subscription service available. A lowest price subscription may require a relatively large amount of advertising content to be accessed. A medium price subscription may require a smaller amount of advertising content to be accessed. A highest price subscription may not require any advertising content be accessed. In some examples, the amount of advertising that is required can depend on the type (e.g., category) of advertising that is selected for access by the user 102. The dock 108 can record the advertising content accessed by the user 108 as user information mentioned above with respect to block 510. The amount of and which advertising content was accessed can then be provided to the fulfillment server 400 which can, in turn, determine whether the user 102 has accessed the required amount of advertising content per their subscription. In some examples, the authorization of another memory device 104 can be based on whether the user 102 has accessed the required amount of advertising content.

In some examples, the advertising content can be accessed by the user 102 specifically selecting the content for access from the memory device 104. In other examples, the dock 108 can automatically include the advertising content with the content being accessed by the user 102. For example, the dock 108 can add commercials to movies viewed by the user 102 similar to regular TV viewing. The dock 108 could also add advertising to printed content similar to advertising on a webpage. In an example, the user 102 can select whether to have automatic advertising ON or OFF when accessing content.

In some examples, the content on the memory device 104 can be interactive such that a user 102 can select a portion of the content and the user 102 can be sent to advertising content corresponding to the portion of the content selected. For example, a movie on the memory device 104 can be playing on an external device 307 communicatively coupled to the dock 108. When an item (e.g., a purse) in the movie is shown, a user 102 can "click" on or otherwise select the item in the movie. The movie can then pause, and advertising content related to the purse can be shown instead of or in addition to the movie. The advertising content can comprise content stored on the memory device 104, and/or a webpage on the internet.

Figure 6:
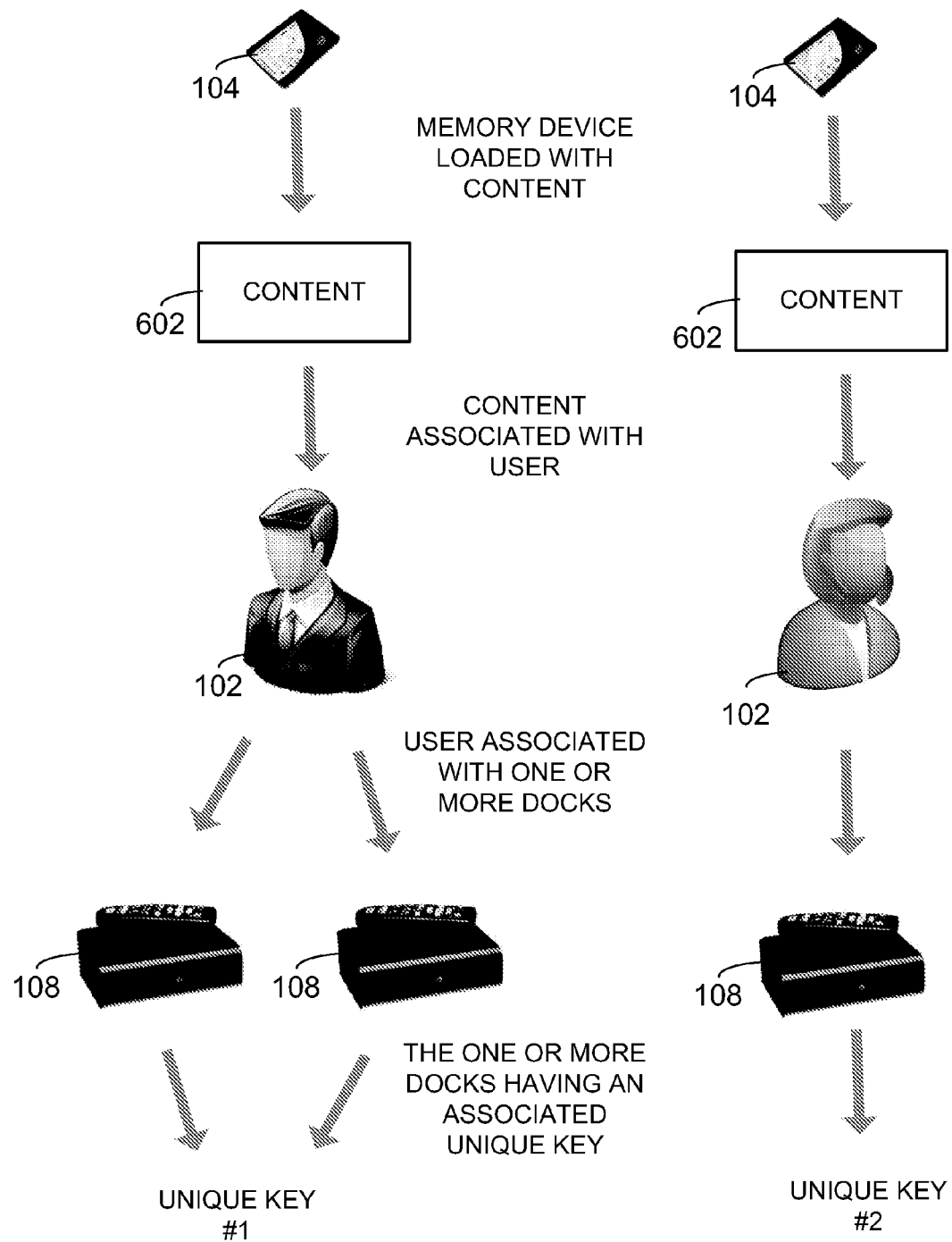
FIG. 6 illustrates generally an example of a method for encrypting a memory device with a unique key.

FIG. 6 illustrates an example of a method for encrypting a memory device 104 with a unique key. As mentioned above, the memory devices 104 can be protected with a unique key corresponding to one or more docks 108. The key management system 406 can comprise a database that associates a user 102 and or one or more docks 108 with a unique key. Accordingly, upon loading a memory device 104 with content 602, the fulfillment server 408 can receive a unique key from the key management system 406 corresponding to a user 102 to which the content 602 on the memory device 104 is associated and provide the unique key to the memory device 104. When loading a memory device 104 is completed, the memory device 104 can be protected using the unique key by encrypting another encryption key using the unique key. The memory device 104 can then be ejected and de-coupled from the slot of the cabinet 414, where a shipping label is printed and attached thereto.

Accordingly, the key management system 406 can include a plurality of unique keys, wherein each unique key is associated with one or more docks 108 having a matching copy of the unique key. Each dock 108 can then be linked to a user 102 (e.g., a user account) associated with the dock 108, and each user 102 can be linked to content 602 to be loaded onto a memory device 104. Accordingly, the key management system 406 can be used to link content 602 on a memory device 104 to a specific unique key for protecting the memory device 104 that stores the content 602 for a user 102, such that the user 102 can couple the memory device 104 to a dock 108 associated with the user 102 and access the content 602 on the memory device 104 using the unique key.

FIG. 7 illustrates an example of loading content from one or more content databases 702, 704 onto a memory device 104. As shown, the user selected content 706 corresponding to the selection information for user is loaded onto the memory device from the content database 702. In an example, the memory device 104 is loaded with extra content 708 that was not specifically selected by the user 102. This extra content 708 can, for example, be selected by the fulfillment system 106 from the content database 702. Advantageously, lesser known content or content that is to be encouraged can be added to the memory device 104. For example, certain lesser known content can be added to memory devices 104 in order to, hopefully, be accessed by users 102 and therefore increase the audience base for the content. The users 102 may become interested in the content and desire more content from the producer/artist. Thus, the lesser known content can develop a consumer base using the systems, methods, and apparatuses discussed herein. In exchange for generating a consumer base for the content, the producer/artist for the lesser known content can pay a fee to a service provider operating the fulfillment system. In other examples, the service provider can launch their own content by adding the content to the drives. In some examples, the content added to the memory device 104 can be well known content and can be encouraged due to, for example, advertising in the content.

In some examples, the extra content 708 can be selected by the fulfillment system 106 based on user information. For example, the fulfillment system 106 can select content that is similar to or related in some manner to the content selected by the user 102. In some examples, the user 102 can request that extra content 708 selected by the fulfillment system 106 be added to the memory device 104. Content can be tagged with information and the tags on the content selected by the user 102 can be used to select other similar information. In some examples, a selection history of the user 102 can be maintained, the selection history comprising information of multiple user selections over a period of time. The extra content 708 can be based on the selection history. In some examples, the extra content 708 can be selected based on content that the user 102 has previously received, such that the user 102 does not receive repeat content, or does not receive the same content within a given time period. In some examples, an access history comprising a history of the content accessed by the user 102 can be maintained. The access history can be used to select extra content 708 in a manner similar to that described above with respect to the selection history. For example, extra content 708 can be selected such that content that has already been accessed by the user 102 is not re-provided to the user 102. In another example, the extra content 708 can be selected based on which content was and was not accessed by the user 102.

The type of tags used for the content is not limited to any specific type of tag. For example, movies can be tagged, by year, actor, category (e.g., action), or even customized tags such as movies with specific scenes, locations, etc. In some examples, the tags for movies can be obtained from already populated tag database, e.g., from IMDB, the motion picture industry, or other databases. In some examples, a user 102 after accessing content can select attributes (e.g., tags) of the content that the user 102 liked so that the fulfillment system can use the attributes of the content in selecting extra content 708 for the user 102. Furthermore, in some examples, the attributes can be ranked by the user. In yet other examples, the dock 108 can prompt a user 102 to respond regarding whether (or how much) the user 102 liked or did not like the content.

In some examples, after accessing content the dock 108 can prompt a user 102 with suggested content and ask whether the user 102 would like to access the suggested content. The suggested content can be linked to the user 102 by tags from the user's previous selections as mentioned above, and/or based on tags from the content that was just accessed. In some examples, the suggested content can be extra content 708 that is on the memory device 104. In some examples, the suggested content can be content not present on the memory device 104, but the suggested content if selected by the user 102 can be added to the user's selected content such that the content will be loaded on a future memory device 104 for the user 102.

In some examples, the tags for content can be both hierarchical and non-hierarchical. For example, content can be linked through tags to other content in hierarchical system such that the a first subsection of content can be grouped together under a first heading (e.g., a category such as action) and the first subsection can be further divided into additional subsection that are each under headings more granulated than the first heading. In addition to these hierarchical groupings, content can be linked tangentially by relationships that are non-hierarchical which comprise a single level. In some examples, portions of the content can be tagged. Accordingly, one or more specific portions of, for example, a movie can be linked using the tags as mentioned above.

In some examples, the user 102 can provide a search command to search for content on a memory device 104 coupled to a dock 108 using the tags and/or other identifying data. The search command can be received by the dock 108 which can identify content based on the search command and provide the content, a portion thereof, or a list thereof to the user 102. In some examples, the search command can be received through voice recognition of a spoken command from the user 102. The user 102 can provide a voice search command to an external device 102, the voice search command can be converted into text and the content and/or tags can be searched based on the search command. In an example, when the content includes movies, the search commands can search data regarding closed captioning for the movies. Thus, a movie can be identified and linked to a specific portion or time in the movie corresponding to the search command. In order to reduce the processing required to convert the voice signal into text, a voice command received can be compared against a limited library voice signals corresponding to the content on the memory device 104. Accordingly, it will be determined whether a voice signal received corresponds to any of the content on the memory device 104. In an example, when content is loaded on the memory device 104 an associated voice recognition file corresponding to the loaded content can also be loaded onto the memory device 104. This associated voice recognition file can then be used to link the content to a voice signal during voice recognition. Furthermore, in some example, gesture recognition can be used to send commands to the dock 108. The dock 108 can have a camera, infrared, thermal sensor, or other device coupled thereto or to an external device 307 in order to identify the gestures of the user 102.

Figure 8:
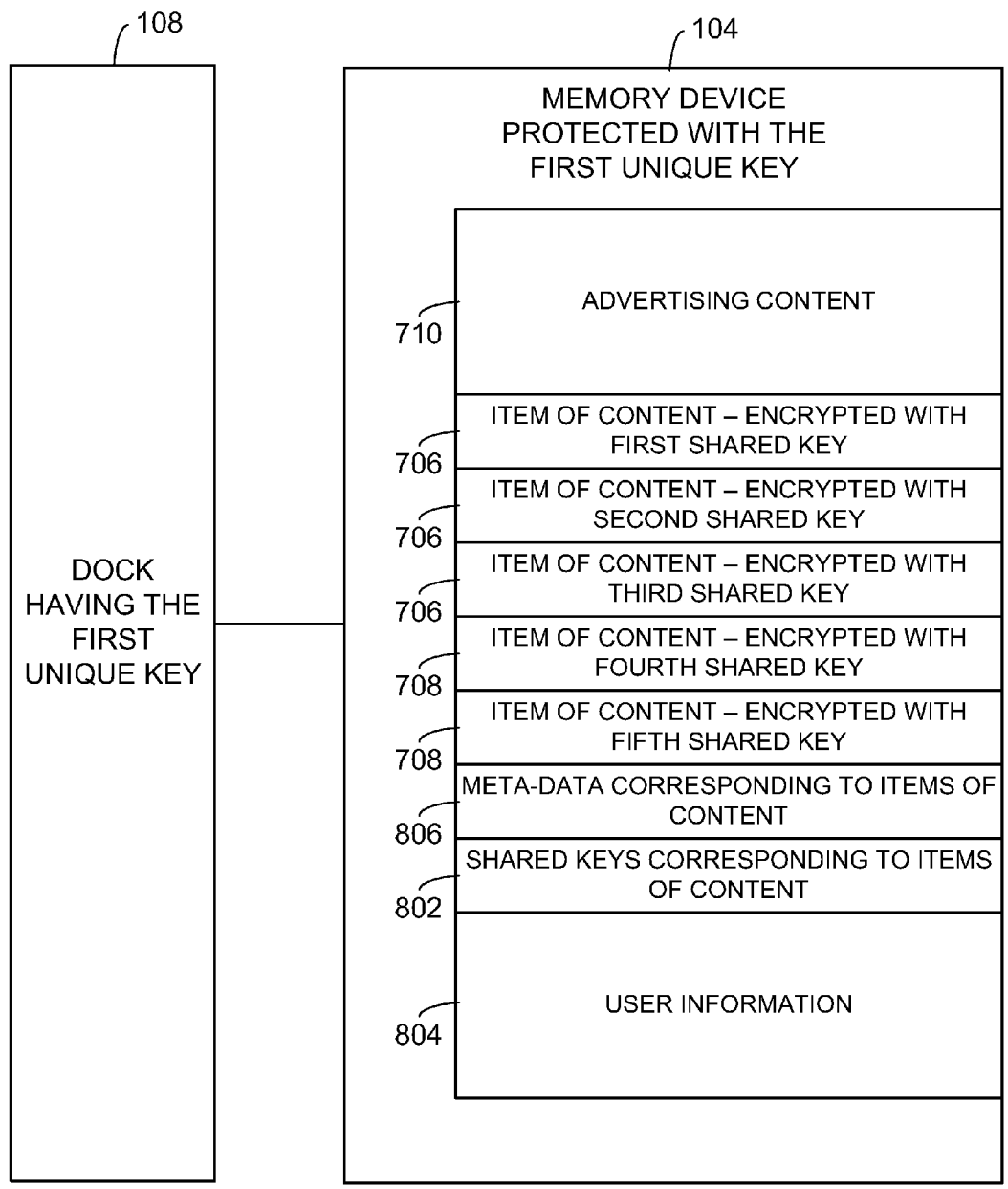
FIG. 8 illustrates an example of a memory device with content thereon coupled to a dock.

FIG. 8 illustrates an example of a memory device 104 coupled to a dock 108. As discussed above, the memory device 104 can include advertising content 710 for a user 102 associated with the dock 108. The memory device 104 can also include a plurality of items of content 706, 708 including user selected content 706 and extra content 708 added to the memory device 104 based on a user history. Each item of content 706, 708 can be encrypted with a shared key, and different items 706, 708 can be encrypted with different shared keys. The memory device 104 can also include the shared keys 802 corresponding to the content 706, 708. The memory device 104 can also include user information 804 as discussed above. Additionally, the memory device 104 can include meta-data 806 related to the items of content 706, 708. In an example, the meta-data can include voice recognition information relating to the content as discussed above. The memory device 104 can be encrypted with a first unique key that corresponds to the first unique key of the dock 108.

Accordingly, the dock 108 can provide the first unique key to the memory device 104. The memory device 104 can receive the first unique key and since the first unique key matches the unique key used to protect the memory device 104, the memory device 104 can unlock and provide the dock 108 access to the data 710, 706, 708, 802, 804 on the memory device 104. The dock 108 can use the shared keys 802 to decrypt and access the items of content 706, 708. The dock 108 can also add advertising content 710 as appropriate. Additionally, the dock 108 can store user information 804 in the memory device 104.

Figure 9:
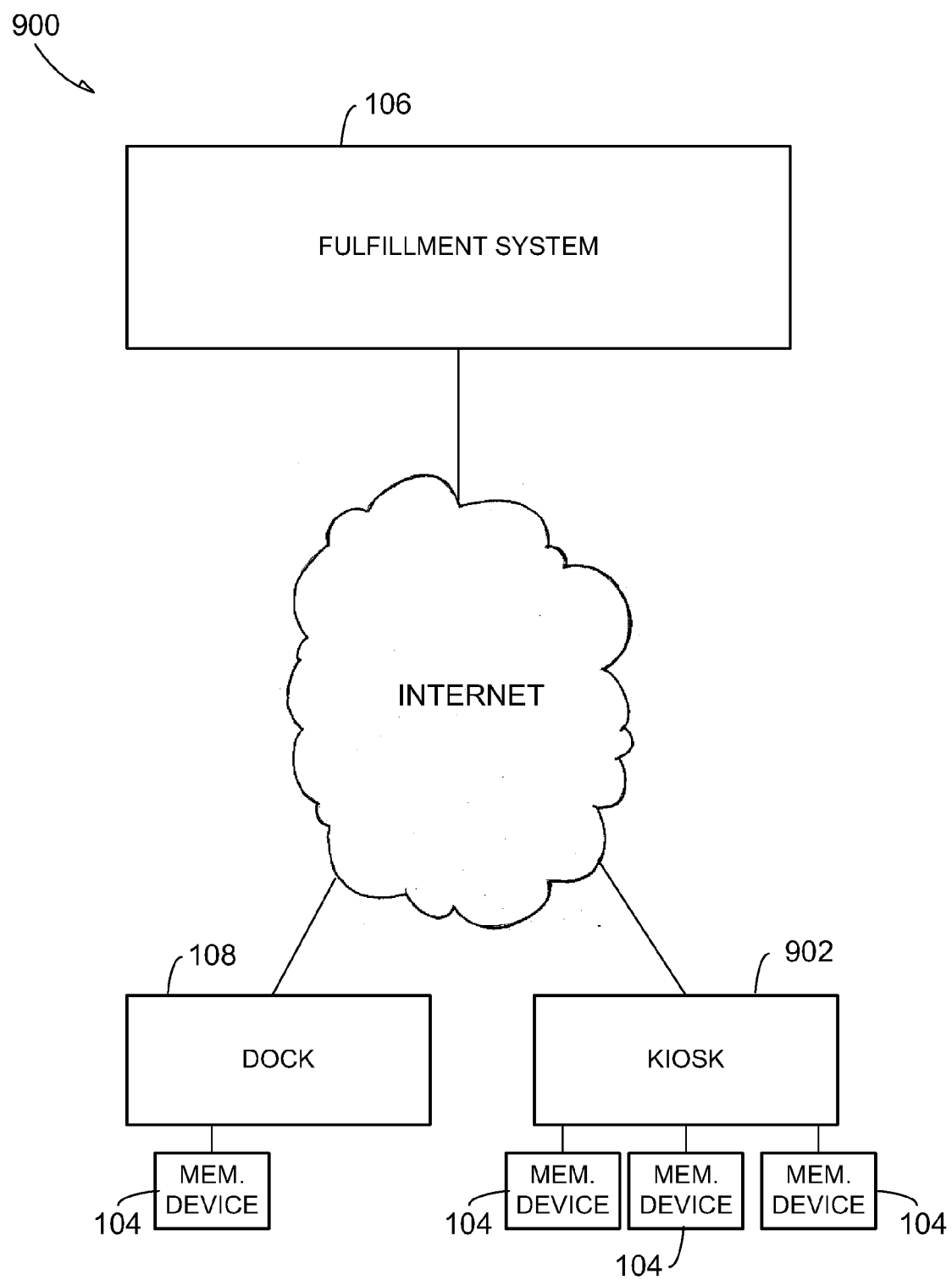
FIG. 9 illustrates generally another example of a system for managing and distributing content to a plurality of users.

FIG. 9 illustrates generally another example of a system 900 for managing and distributing content to a plurality of users 102. System 900 operates similar to system 100 as described above with respect to FIG. 5. Similar to method 500, a user 102 can make selections of content for loading onto a memory device 104 (block 502). In system 100, however, the content for a memory device 104 is loaded onto the memory device 104 by streaming the content from the fulfillment system 106 to a dock 108 over a network (e.g., the internet). Once the content is received at the dock 108 the content can be stored on the memory device 104 coupled to the dock 108. In an example, the content can be streamed using the shared key encryption for each item of content as discussed above. Once the content is received by the dock 108, the content can be stored on the memory device 104 which is protected with a unique key corresponding to the dock 108. In an example, the shared keys corresponding to each item of content can be provided to the dock 108 at a previous time. In an example, these shared keys are not streamed over the internet to the dock 108. In an example, these shared keys are stored on the memory device 104 by, for example, the fulfillment system 106 and the memory device 104 is mailed to the user 102. Accordingly, the shared keys can be accessible by the dock 108 without being sent over the internet. Additionally, a catalog of shared keys available to a dock 108 can be updated over time as memory devices 104 are returned to the fulfillment system and sent to the user 102. In another example, the shared keys are incorporated into the dock 108 during manufacture of the dock 108.

Accordingly, the content can be securely transported and stored by being sent from the fulfillment server 400 to a secure device (e.g., the dock 108 having a unique key and a tamperproof case 313). Additionally, once the content is stored, the content is still secure from copying since the content is stored on the memory device 104 that is protected with a unique key. Accordingly, when the memory device 104 is de-coupled from the dock 108, the memory device 104 is encrypted protecting the content thereon. In system 900, therefore, the dock 108 functions as both a content access device for accessing content on the memory device 104 and as a content loading device by receiving content from the fulfillment system 106 over the internet and loading the content onto a memory device 104. Accordingly, the memory device 104 can be securely loaded from a remote location with respect to the fulfillment system 106.

In another example, the fulfillment system 106 can stream the content for a user to a remote kiosk 902 having one or more memory devices 104 located therein. The remote kiosk 902 can act as a loading device for the memory device 104 and can extract user information from the memory device 102 to provide to the fulfillment system 106. In some examples, a remote kiosk 902 can operate similar to a cabinet 414 in the fulfillment system 106 except that the remote kiosk is located remotely from the fulfillment system 106 and communicatively coupled to the fulfillment system 106 via a network (e.g., the internet).

In an example, the remote kiosk 902 can be located in a store or other location that is readily accessible by a user. In an example, the remote kiosk 902 can include at least one processing device coupled to a memory having instructions thereon for execution by the at least one processing device. The remote kiosk 902 can also include an input device for receiving information from a user, and a port configured to couple to a memory device 104. In an example, the input device can include a touchscreen, keyboard, and/or a mouse. In some examples, the user can pick out a memory device 104 from the store and couple the memory device 104 to the remote kiosk 902 via the port. In other examples, the remote kiosk 902 can be set up as a vending machine where one or more memory devices 104 are internal to the remote kiosk 902 and the user can select a memory device 104 for use. The remote kiosk 902 can also include a communication circuit for communicating with the fulfillment system 106.

In an example, a plurality of memory devices 104 can be pre-loaded with digital content (e.g., by the fulfillment system 106) and delivered to a location (e.g., a store) nearby the kiosk 902. Different memory device 104 can have different content such that a user can select a particular memory device 104 in order to access the content thereon. For example, a first memory device 104 can include music from the 1960s and a second memory device 104 can include the seasons of the Simpsons. In some examples, where the kiosk 902 is a vending machine, the memory devices 104 can be loaded into the kiosk 902. In any case, the pre-loaded memory devices 104 can be selected by a user for purchase or rent. When a memory device 104 is not internal to the kiosk 902, the memory device 104 can be manually coupled to the kiosk 902 by the user via the port. When a memory device 104 is internal to the kiosk 902, the memory device 104 can be coupled to the port by the kiosk 902 or can be already coupled to a port when loaded into the kiosk 902. When memory devices 104 are internal to the kiosk 902, the user can provide a selection of which memory device 104 he or she would like to select.

In any case, once a memory device 104 is coupled to the kiosk 902, the kiosk 902 can receive an indication of a dock to which the memory device 104 is to be coupled. The indication can be received from a user via the input device. In an example, the indication can include user identification information (e.g., user name, user account info, etc.). Based on this user information, the kiosk 902 can protect (e.g., encrypt) the memory device 104 with a unique key corresponding to a dock 108 of the user. In an example, the kiosk 902 can look-up the unique key corresponding to the dock 108 via a database that links the unique key to the dock or the user account or both. Thus, the user can select a particular memory device 104 based on the content pre-loaded on the memory device 104 and the kiosk 902 can protect the memory device 104 for use by a dock corresponding to the user.

In an example, the kiosk 902 can maintain a local database linking the unique key with a user account, dock, or both. This database can, for example, be updated by communicating with a server (e.g., in the fulfillment system 106). In other examples, the kiosk 902 can send a request to a server (e.g., in the fulfillment system 106) for the unique key corresponding to the indication of a dock received at the kiosk 902. The kiosk 902 can send an indication of a dock to the server in the request. The server can look-up the unique key corresponding to the dock in a database at the server. The server can then send the unique key back to the kiosk 902, and the kiosk 902 can use the unique key to protect the memory device 104.

In an example, the kiosk 902 can also load digital content onto the memory device 104. The digital content can be selected by the user or can be selected by the kiosk 902 or fulfillment system 106. In an example, the user can select digital content via the input device of the kiosk 902. The kiosk 902 can then load the selected content on the memory device 104. The content can be stored locally on the kiosk 902 or can be downloaded from the fulfillment system 106. In an example, the user can pre-select content for loading by the kiosk 902. For example, the use can provide content selections (e.g., via a webpage, phone, etc.) to the fulfillment system 106 and select a kiosk 902 (e.g., via location) at which the user will load the content onto a memory device 104. The fulfillment system 106 can then communicate with the selected kiosk 902 and provide the selected content for download to the selected kiosk 902. The selected kiosk 902 can then download the content and store the content locally until the user accesses the kiosk 902 to load the content onto a memory device 104. In some examples, the kiosk 902 could also pre-protect the content such that the user can simply input identification information and the kiosk 902 could provide a protected memory device 104 corresponding to a dock of the user and the memory device 104 can have selected content loaded thereon.

As an extension of the fulfillment system 106, the content loaded onto the memory device 104 at the kiosk 902 can include any of the content described above. For example, the content can include videos, movies, advertising content, product information, medical records/information, etc. In particular, the kiosk 106 can load product information (e.g., a product catalog) and associated information. If the memory device 104 is being returned or re-loaded from a user 102, any product selection (purchase) information on the memory device 104 can be downloaded onto the kiosk 902 and forwarded to the appropriate retailer/vendor.

In some examples, the stream from the fulfillment system 106 to the dock 108 and/or remote kiosk 902 can be limited in speed (e.g., amount of data per time). In an example, the speed limit can be based on a speed that the data is to be provided to a user 102. For example, some items of content (e.g., a movie, song) are to be displayed, sound produced, or otherwise provided in a sequence over a certain time interval. In these situations, the speed can be limited to at or near the speed at which the data is to be provided to a user 102. For example, content corresponding to a movie could be provided to the dock 108 and/or remote kiosk 902 at or near the speed that the content is to be rendered on a display at the external device 307. Accordingly, even if a connection to the dock 108 could support higher speeds of data transfer, the data transfer speed could be limited. Limiting the speed of streaming can reduce the likelihood of the content being used in an unauthorized manner, because even if someone identified a way to make unauthorized copies of the stream, they would be limited to copying the data at a slower speed. Accordingly, the appeal of copying the stream may be lessened since it would take long periods of time to copy large amounts of data.

Additionally, in some examples, to further protect the content from unauthorized copying, the content streamed over the internet can be segmented and loaded over a period of time. For example, a first segment can be sent at a first time, with a break between the first segment and a second segment which is sent at a second time. The times for sending each segment can be random to further reduce the likelihood of copying of the data. Accordingly, the memory device 104 could be "trickle" loaded over a period of time.

In some examples, the dock 108 can provide an error code when the dock 108 malfunctions. For example, if the tamperproof case 313 is breached on the dock 108, the dock 108 can provide a first code, if a hardware component on the dock 108 malfunctions, the dock 108 can provide a second code. In an example, a combined code can be provided by the dock 108. The combined error code comprises multiple codes corresponding to multiple different errors that are concatenated together. If a dock 108 malfunctions, the user 102 can call or otherwise access a customer service for the dock 108 and the user 102 can provide the customer service with the error code. Advantageously, when the error code is a combined code, the user 102 can provide the customer service with a single code for all errors.

In an example, the content distribution and management system 100 can be used to securely send content from one user 102 to another user 102. For example, a first user 102 can load content onto a memory device 104 coupled with a first dock 108. The first user 102 can then de-couple the memory device 104 from the first dock 108. Since the memory device 104 is protected with a unique key corresponding to the first dock 108, when the memory device 104 is de-coupled from the first dock 108, the memory device 104 is locked. The first user 102 can then send the memory device 104 to the fulfillment system 106. The first user 102 can also provide an indication of where to send (e.g., to the second user 102) the content on the memory device 104 from the fulfillment system 106. In an example, this indication of where to send the content can be loaded as user information on the memory device 104. In some examples, the first user 102 can also provide an indication of which content on the memory device 104 to send to the second user 102.

The fulfillment system 106 can receive the memory device 104, link the memory device 104 to the first user 102 and unlock the memory device using the unique key corresponding to the first user 102. The fulfillment system 106 can then prepare a memory device 104 for the second user 102 having the content provided by the first user 102 thereon. In an example, the fulfillment system 106 can use the memory device 104 returned from the first user 102 by removing and/or adding content to/from other entities to the memory device 104 and re-protecting the memory device 104 with the unique key corresponding to the second user 102 (e.g., a second user account). In another example, the fulfillment system 106 can load the content from the first user 102 onto another memory device 104 (possibly in conjunction with other content) and the fulfillment system 106 can protect the another memory device 106 with the unique key corresponding to the second user 102. The fulfillment system 106 can then send the memory device 104 protected with the unique key corresponding to the second user 102 to the second user 102. The second user 102 after receiving the memory device 104 can unlock the memory device 104 with a dock 108 having the unique key associated with the user 102 and the user 102 can access the content from the first user 102.

Accordingly, content from a first user 102 can be securely sent from the first user 102 to the second user 102 without anyone else being able to de-crypt the content. This process can be carried out on a large scale such that a plurality of users 102 could send content to one another using unique keys associated with each user 102 (e.g., user account) and using the fulfillment system 106 as an intermediary between users. Additionally, a user 102 can instruct the fulfillment system 106 to send content to multiple users 102 in the same manner. Accordingly, only users 102 to which the content is sent are able to decrypt and access the content.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of protecting digital content at a kiosk, the method comprising:
   providing a plurality of memory devices, the plurality of memory devices having pre-loaded content thereon;
   receiving a selection from a user;
   selecting a memory device from the plurality of pre-loaded memory devices that matches the selection from the user;
   determining a dock to which the memory device is to be coupled, wherein the dock is an electronic device that is distinct from the kiosk and is configured to access content on one or more of the memory devices; and
   protecting the memory device with a unique key corresponding to the dock.

2. The method of claim 1, wherein determining a dock includes receiving an indication of a dock to which the memory device is to be coupled from a user accessing the kiosk.

3. The method of claim 1, wherein the selection from the user indicates the memory device that is to be coupled to the dock.

4. The method of claim 1, wherein the selection from a user corresponds to content that matches content on the memory device.

5. The method of claim 1, comprising:
   using a fulfillment server to pre-load content onto the plurality of pre-loaded memory devices; and
   delivering the plurality of pre-loaded memory device to a location nearby the kiosk.

6. The method of claim 1, comprising:
   loading additional content onto the memory device.

7. The method of claim 1, comprising:
   receiving a selection from the user indicating additional content to load onto the memory device, wherein loading additional content includes loading content corresponding to the selection from the user.

8. The method of claim 1, wherein loading additional content includes loading content selected by one of the kiosk or a fulfillment system.

9. The method of claim 1, wherein the plurality of memory devices include memory devices with different pre-loaded content.

10. A method of protecting digital content at a kiosk, the method comprising:

provinding a plurality of memory devices, wherein at least a subset of the plurality of memory devices have pre-loaded content thereon;

receiving a selection of content from a user;

selecting one or more of the plurality of memory devices as a function of the selection of content from the user, wherein selecting includes if the selection of content from the user matches content on one of the at least a subset of memory devices, selecting the one of the at least a subset of memory devices having pre-loaded content thereon;

if the selection of content from the user does not match content on one of the at least a subset of memory devices, selecting one of the plurality of memory devices and loading content corresponding to the selection on the one of the plurality of memory devices;

receiving an indication of a dock to which the selected memory device is to be coupled, the indication received from a user accessing the kiosk, wherein the dock is an electronic device that is distinct from the kiosk and is configured to access content on one or more of the memory devices; and protecting the selected memory device with a unique key corresponding to the dock.

11. The method of claim 10, wherein the plurality of memory devices include memory devices with different pre-loaded content.

12. A kiosk comprising:

a plurality of memory devices, the plurality of memory devices having pre-loaded content thereon;

at least one processing device;

a memory coupled to the at least one processing device, wherein the memory includes instructions which, when executed by the one or more processors, cause the one or more processors to:

receive a selection from a user;

select a memory device from a plurality of pre-loaded memory devices that matches the selection from the user;

determine a dock to which the memory device is to be coupled, wherein the dock is an electronic device that is distinct from the kiosk and is configured to access content on one or more of the memory devices for consumption thereof, wherein the dock is associated with a particular user account and includes a unique key for accessing content on the one or more memory devices; and protect the memory device with a unique key corresponding to the dock.

13. The kiosk of claim 12, wherein the selection from the user indicates the memory device that is to be coupled to the dock.

14. The kiosk of claim 12, wherein the selection from a user corresponds to content that matches content on the memory device.

15. The kiosk of claim 12, wherein the instructions cause the one or more processors to:

load additional content onto the memory device based on the dock and corresponding user to which the memory device is to be coupled.

16. The kiosk of claim 12, wherein the instructions cause the one or more processors to:

receive a selection from the user indicating additional content to load onto the memory device, wherein loading additional content includes loading content corresponding to the selection from the user.

17. The kiosk of claim 12, wherein the at least a subset of memory devices include memory devices with different pre-loaded content.

18. The kiosk of claim 12, wherein determine a dock includes receive an indication of a dock to which the memory device is to be coupled from a user accessing the kiosk.

19. The kiosk of claim 12, wherein the instructions cause the one or more processors to:

download product selection information from a memory device being returned from a user, the product selection information corresponding to a product to be purchased by a user that was selected while the memory device was coupled to a dock; and send the product selection information over the internet to an appropriate entity for purchase of the product by the user.

20. The kiosk of claim 19, wherein the instructions cause the one or more processors to:

update a product catalog stored on the memory device.

\* \* \* \* \*